United States Patent
Matsen et al.

(10) Patent No.: US 9,517,594 B2
(45) Date of Patent: Dec. 13, 2016

(54) COMPOSITE STRUCTURE HAVING A STABILIZING ELEMENT

(71) Applicant: The Boeing Company, Seal Beach, CA (US)

(72) Inventors: Marc R. Matsen, Seattle, WA (US); Mark A. Negley, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 768 days.

(21) Appl. No.: 13/644,628

(22) Filed: Oct. 4, 2012

(65) Prior Publication Data

US 2014/0099477 A1    Apr. 10, 2014

(51) Int. Cl.
*B29C 70/34* (2006.01)
*B29C 70/54* (2006.01)

(52) U.S. Cl.
CPC .......... *B29C 70/34* (2013.01); *B29C 70/543* (2013.01); *Y02T 50/433* (2013.01); *Y10T 156/10* (2015.01); *Y10T 428/24562* (2015.01)

(58) Field of Classification Search
CPC .......... B29C 70/34; B29C 70/543; B32B 1/00; B32B 3/00; Y10T 428/24562; Y10T 156/10
USPC .................. 428/156, 166, 172, 292.1, 297.1, 300.7,428/119, 114
See application file for complete search history.

(56) References Cited

U.S. PATENT DOCUMENTS

| | | | |
|---|---|---|---|
| 5,639,535 A * | 6/1997 | McCarville | B29C 70/30 156/182 |
| 5,685,940 A | 11/1997 | Hopkins et al. | |
| 2004/0065409 A1* | 4/2004 | Lindsay et al. | 156/285 |
| 2009/0297788 A1* | 12/2009 | Dull et al. | 428/189 |

FOREIGN PATENT DOCUMENTS

| | | | | |
|---|---|---|---|---|
| DE | EP 1925436 A1 * | 5/2008 | | B29C 70/086 |
| DK | WO 2010083840 A2 * | 7/2010 | | B29B 11/16 |

OTHER PUBLICATIONS

PCT/US20131056255 International Search Report dated Dec. 3, 2013.
U.S. Appl. No. 13/197,750 entitled "Molybdenum Composite Hybrid Laminates and Methods," filed Aug. 3, 2011.

* cited by examiner

*Primary Examiner* — Catherine A Simone

(57) ABSTRACT

A composite structure may include a laminate and a stabilizing element. The laminate may have a plurality of composite plies. The composite structure may include a geometric discontinuity that may be associated with the laminate. The stabilizing element may be included with the composite plies and may be located proximate the geometric discontinuity.

26 Claims, 16 Drawing Sheets

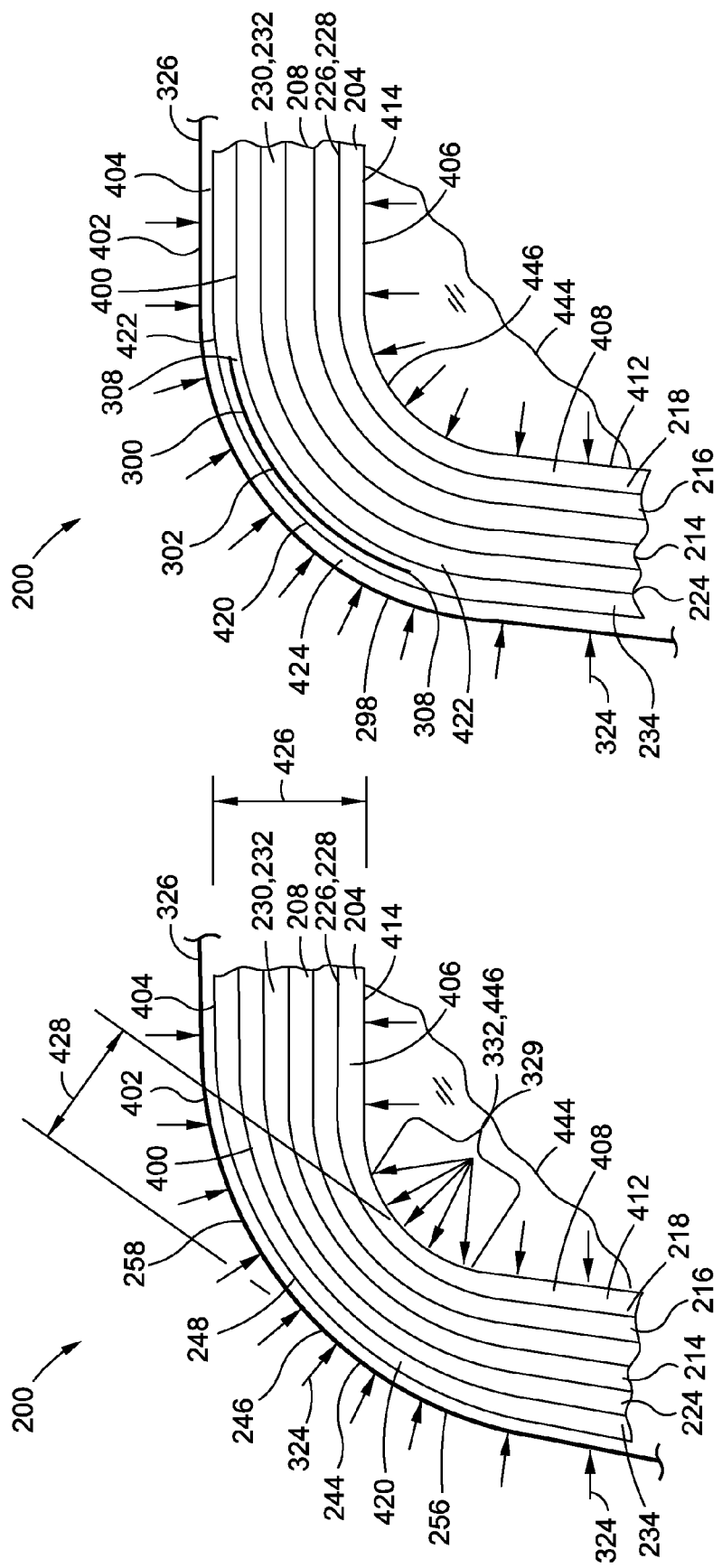

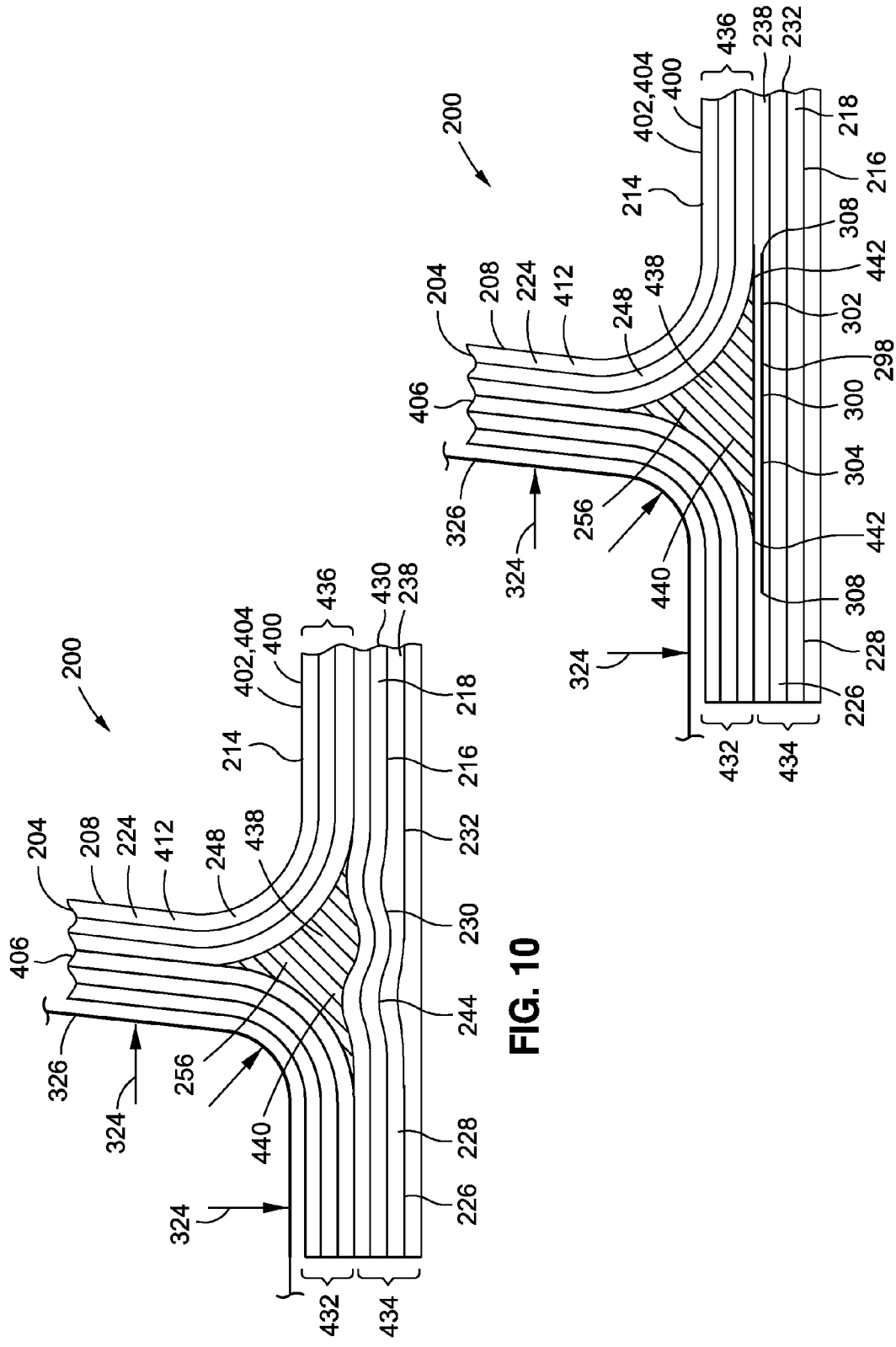

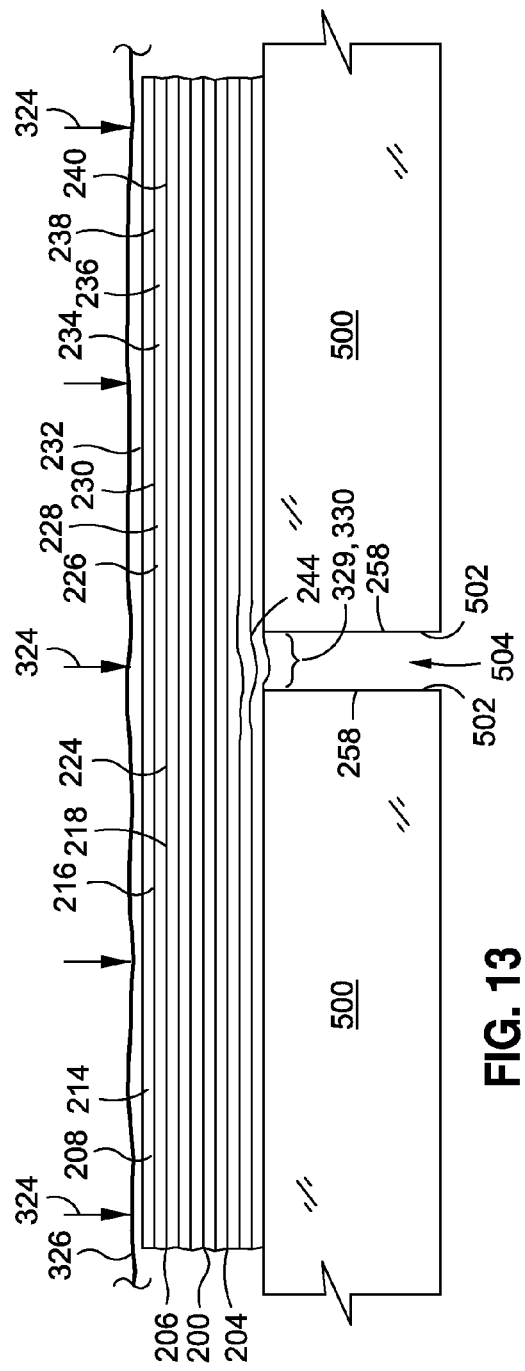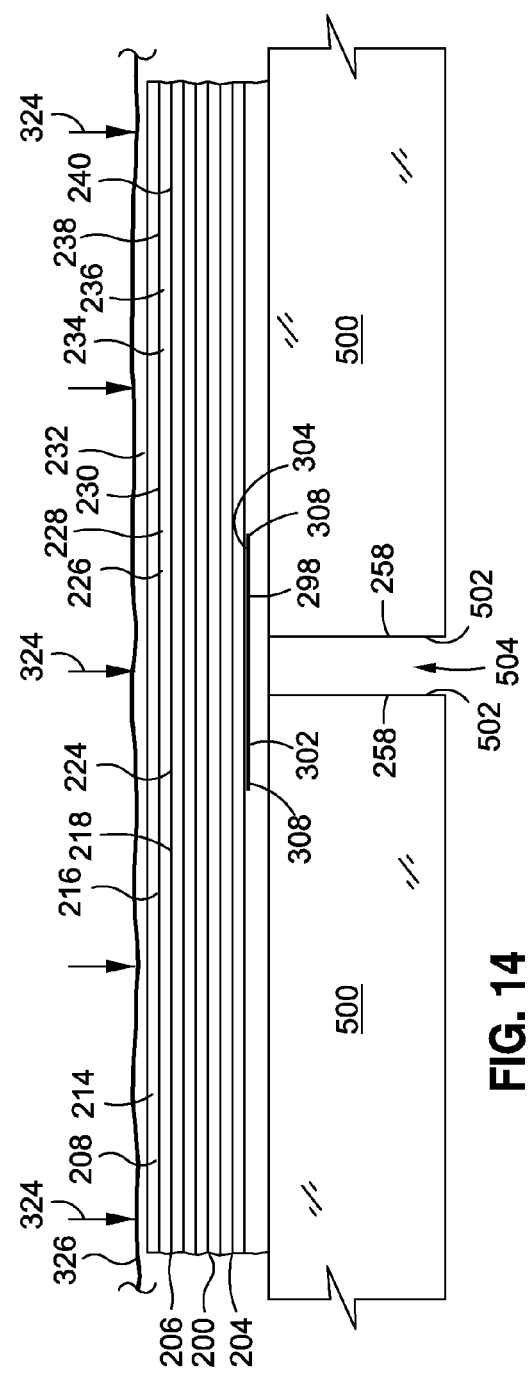

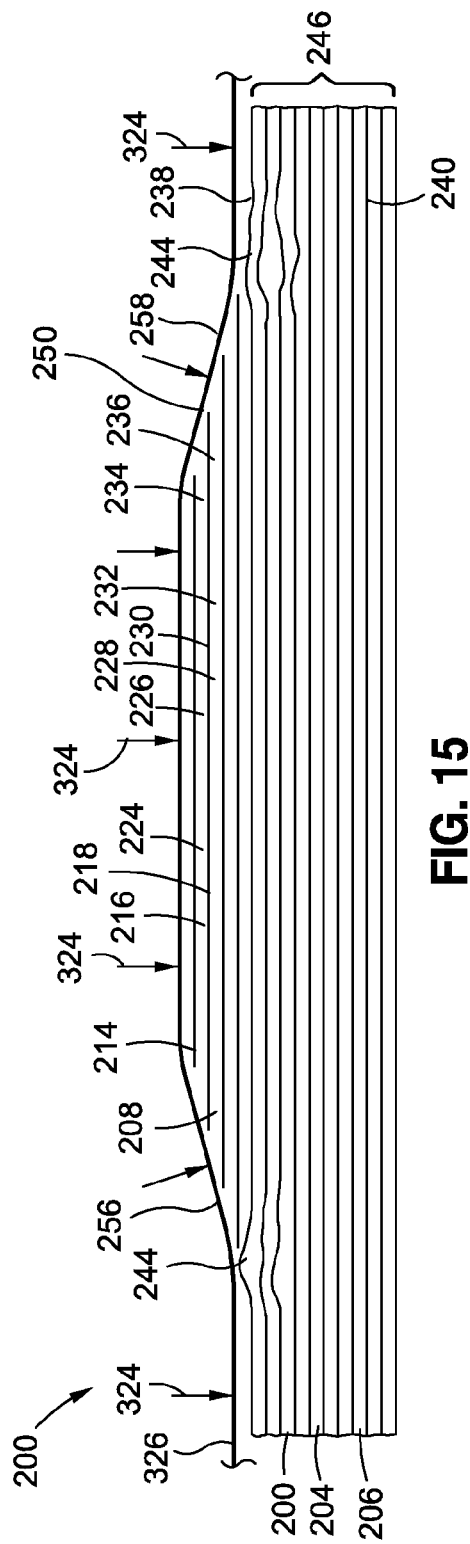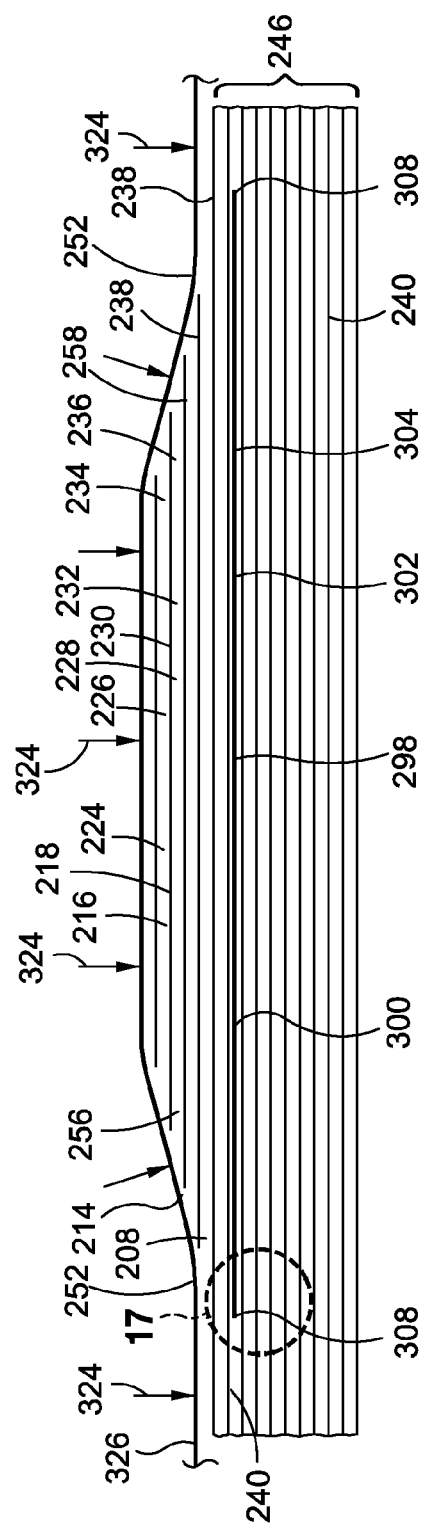

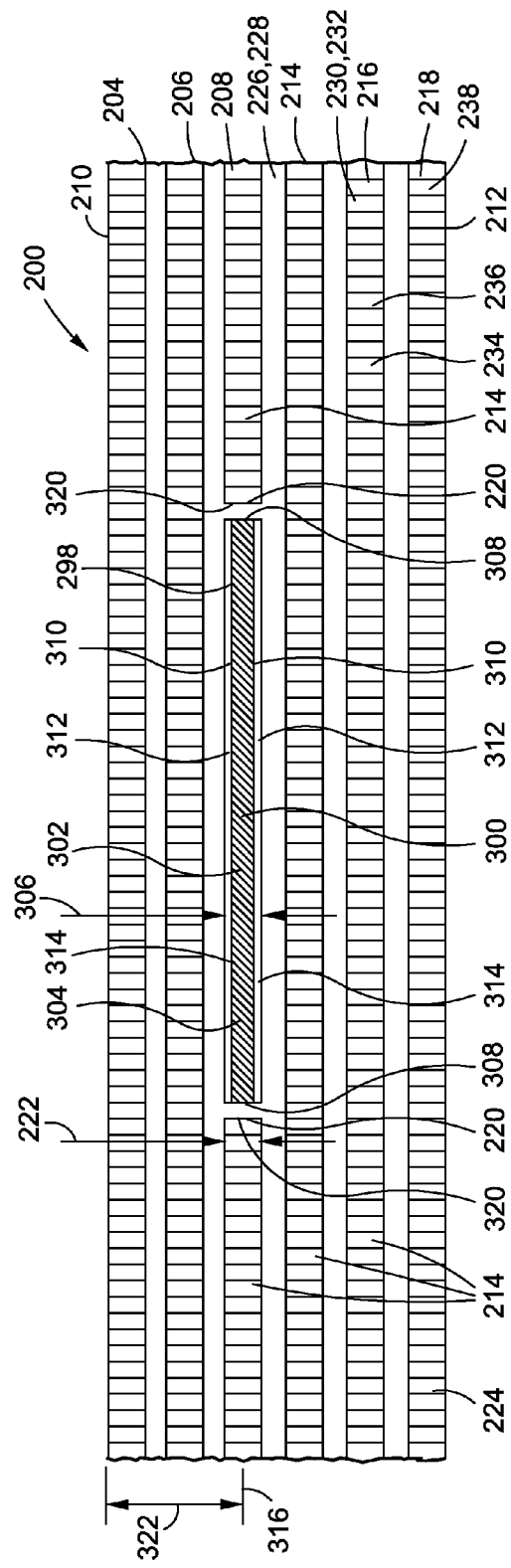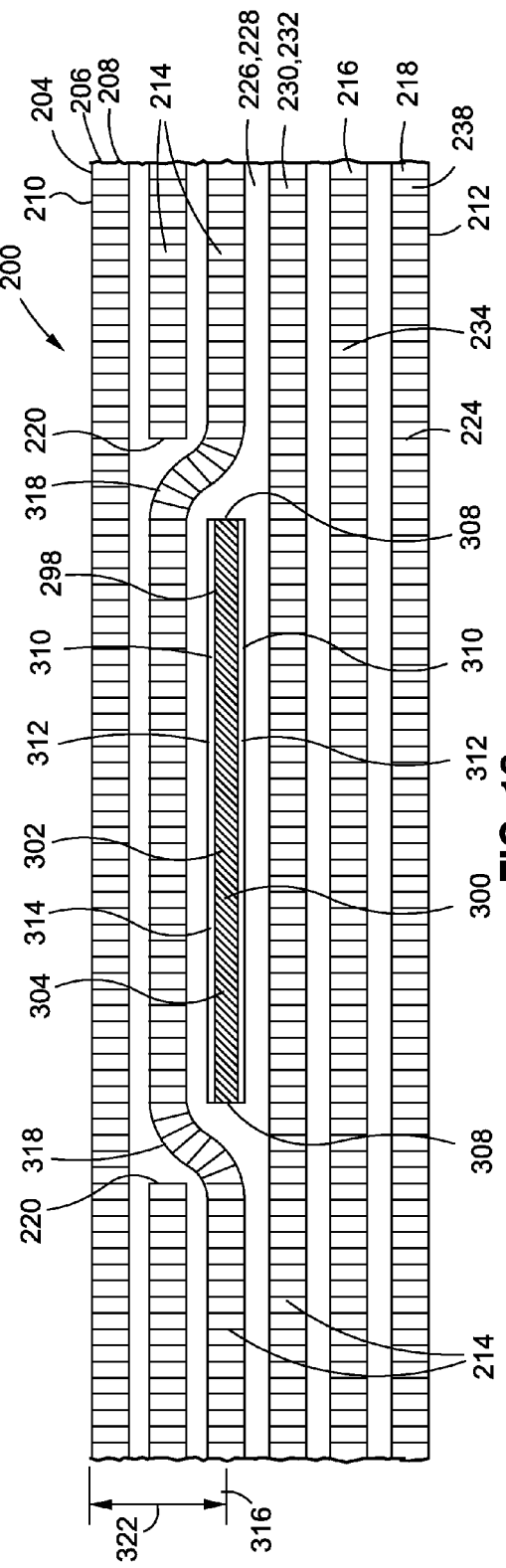

COMPOSITE STRUCTURE HAVING A STABILIZING ELEMENT

REFERENCE TO GOVERNMENT CONTRACT

This invention was made with Government support under Contract No. HR0011-10-2-0001 awarded by Defense Advanced Research Program Agency (DARPA) Defense Science Office and the United States Navy. The government has certain rights in the invention.

FIELD

The present disclosure relates generally to composite materials and methods and, more particularly, to hybrid composite laminates having stabilizing elements.

BACKGROUND

Composite materials are used in a wide variety of structures. In aircraft construction, composite materials may be used to form the fuselage, wings, tail section, and other components. For example, an aircraft fuselage may be constructed of composite skin panels to which composite structural members such as hat stringers may be attached. Hat stringers may increase the strength and stiffness of the skin panels.

During fabrication of a composite structure, layers of composite plies may be laid up over a tool or a mold. The tool or mold may be provided in the desired shape of the final composite structure. The composite plies may comprise a plurality of high-modulus or high-strength fibers such as carbon, glass, or other fibers. The fibers may be pre-impregnated with a polymeric matrix material such as epoxy or thermoplastic resin to form pre-preg composite plies. The fibers in a composite ply may be commonly aligned or oriented in a single direction (e.g., unidirectional) or the fibers in a composite ply may be woven together in two or more directions in a fabric arrangement. Composite structures may be designed to transmit primary loads along the length of the fibers. In this regard, composite structure formed of unidirectional fibers may have a relatively high tensile strength along a lengthwise direction of the fibers.

After the pre-preg composite plies are laid up on the tool or mold, a cure cycle may be performed on the layup. The cure cycle may comprise the application of heat and compaction pressure to the layup. The application of heat may reduce the viscosity of the resin allowing the resin to flow and intermingle with the resin in adjacent composite plies. The application of compaction pressure may include installing a vacuum bag over the layup and/or positioning the layup within an autoclave. The compaction pressure may compact the composite plies against the tool or mold to minimize or reduce porosity and voids in the final composite structure. In addition, the compaction pressure may force the layup against the tool or mold to establish the final shape and surface finish of the composite structure.

Although the vacuum bag may apply substantially uniform pressure to a majority of the layup of pre-preg composite plies, the reduction in resin viscosity during the application of compaction pressure may result in the resin flowing toward regions of low compaction pressure underneath the vacuum bag. The regions of low compaction pressure may occur at locations where there is a geometric discontinuity associated with the layup. The geometric discontinuity may result in out-of-plane fiber movement during curing. For example, a geometric discontinuity may occur at an edge of a structural member (e.g., a stringer, a stiffener, etc.) that may be mounted or joined (co-cured, co-bonded, co-consolidated) to a skin panel formed as a laminate of uncured pre-preg composite plies. The geometric discontinuity at the edge of the stiffener may result in bridging of the vacuum bag from the stiffener edge to the surface of the layup.

The area underneath the bridging may comprise a region of low compaction pressure. Resin may flow toward the region of low compaction pressure and may cause the fibers in the composite plies to also shift toward the region of low compaction pressure. The movement of the fibers may cause the fibers to bunch up resulting in out-of-plane fiber distortion. Upon curing and solidification of the resin, the out-of-plane fiber distortion may become permanently set in the composite structure. The out-of-plane fiber distortion may affect the load-carrying capability of the fibers which are typically designed to provide maximum strength when the fibers are oriented in a common direction within a layer or ply. In this regard, the out-of-plane fiber distortion may have a less than desired effect on characteristics of the final composite structure.

As can be seen, there exists a need in the art for a system and method for minimizing out-of-plane fiber distortion in composite structures.

SUMMARY

The above-noted needs associated with out-of-plane fiber distortion in composite structures are specifically addressed and alleviated by the present disclosure which provides a composite structure that may include a laminate and a stabilizing element. The laminate may have a plurality of composite plies. The composite structure may include a compression discontinuity that may be associated with the laminate. The stabilizing element may be included with the composite plies and may be located proximate to the compression discontinuity.

In a further embodiment, disclosed is a composite structure that may include a laminate and a stabilizing element and wherein the laminate may have a plurality of composite plies. The composite structure may include a geometric discontinuity that may be associated with the laminate. The stabilizing element may be included with the composite plies and may be located proximate to the geometric discontinuity.

Also disclosed is a ply stabilizer. The ply stabilizer may include a stabilizing element for a laminate having a plurality of composite plies. The laminate may have a compression discontinuity associated therewith. The stabilizing element may be included with the composite plies and may be located proximate the compression discontinuity.

Also disclosed is a method of making a composite structure. The method may comprise laying up a laminate with a plurality of composite plies. The laminate may have a compression discontinuity or a geometric discontinuity associated therewith. The method may further include applying a stabilizing element with the composite plies and locating the stabilizing element proximate the a compression discontinuity or the geometric discontinuity.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 8 is a cross-sectional illustration of a radius of the structural member taken along line 8 of FIG. 7 and illustrating the application of pressure by a vacuum bag causing a region of high compaction pressure at a structural member radius and resulting in radius thinning in the structural member radius due to the flow of resin away from the structural member radius;

FIG. 9 is a cross-sectional illustration of the structural member radius of the structural member (e.g., the hat stiffener) of FIG. 8 having a stabilizing element installed proximate the structural member radius and resulting in the minimizing of the radius thinning in the structural member radius;

FIG. 10 is a cross-sectional illustration of a radius filler (i.e., a noodle) of the structural member radius taken along line 10 of FIG. 7 and illustrating out-of-plane fiber distortion at a location proximate the radius filler;

FIG. 11 is a cross-sectional illustration of the radius filler of the structural member of FIG. 10 having a stabilizing element installed proximate the radius filler and resulting in the minimizing of out-of-plane fiber distortion;

FIG. 13 is a cross-sectional illustration of a stiffener mounted to a panel taken along line 13 of FIG. 12 and illustrating out-of-plane fiber distortion occurring at a gap between caul plate edges of the caul plates;

FIG. 14 is a cross-sectional illustration of the hat stiffener and panel of FIG. 13 having a stabilizing element installed in the panel proximate the caul plate edges;

FIG. 15 is a cross-sectional illustration of a pad-up in the panel taken along line 15 of FIG. 3 and illustrating out-of-plane fiber distortion occurring at a perimeter edge of the pad-up;

FIG. 16 is a cross-sectional illustration of the pad-up in the of FIG. 15 and resulting in the minimizing of out-of-plane fiber distortion in the panel;

FIG. 17 is a cross-sectional illustration of the stabilizing element and composite plies arranged such that the stabilizing element edges and ply edges are disposed in opposing relation to one another;

FIG. 18 is a cross-sectional illustration of the stabilizing element and composite plies arranged such that the stabilizing element edges and ply edges are disposed in overlapping relation to one another;

DETAILED DESCRIPTION

Figure 1:
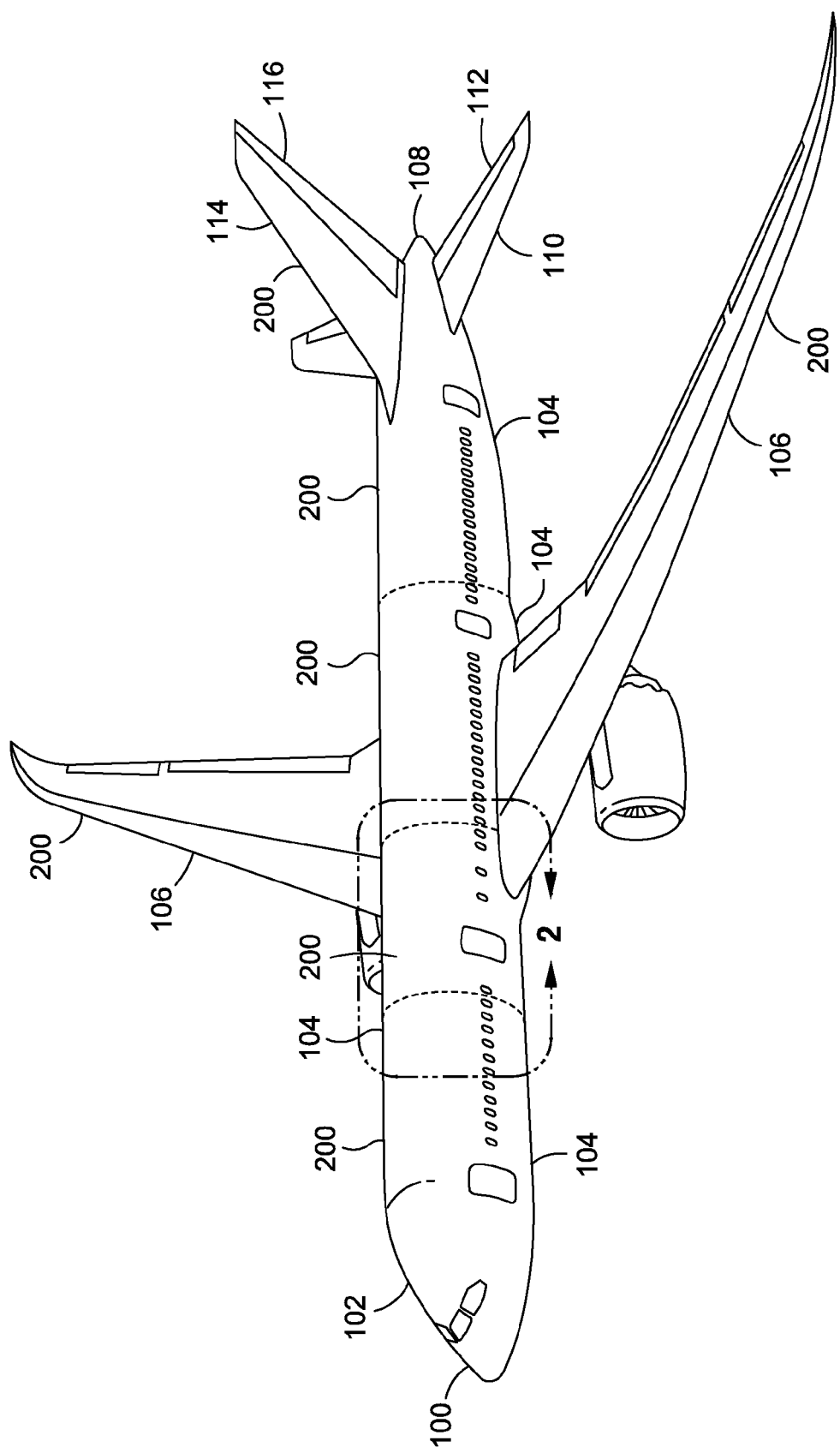
FIG. 1 is a perspective illustration of an aircraft.

Referring now to the drawings wherein the showings are for purposes of illustrating preferred and various embodiments of the disclosure, shown in FIG. 1 is a perspective view of a passenger aircraft 100 formed of one or more composite structures 200. For example, the aircraft 100 may include a fuselage 102 and a pair of wings 106 extending outwardly from the fuselage 102. The fuselage 102 may be comprised of one or more barrel sections 104 which may each be formed as a composite structure 200. Each one of the wings 106 may also be formed as a composite structure 200. The empennage 108 may include a horizontal stabilizer 110, an elevator 112, a vertical stabilizer 114, and a rudder 116 which may additionally be formed as a composite structure 200. Although the present disclosure is described in the context of a fixed wing passenger aircraft 100 as illustrated in FIG. 1, the disclosed embodiments may be applied to aircraft of any configuration, without limitation. Further in this regard, the disclosed embodiments may be implemented on any vehicular or non-vehicular application, without limitation, and are not limited to implementation on an aircraft 100.

Figure 2:
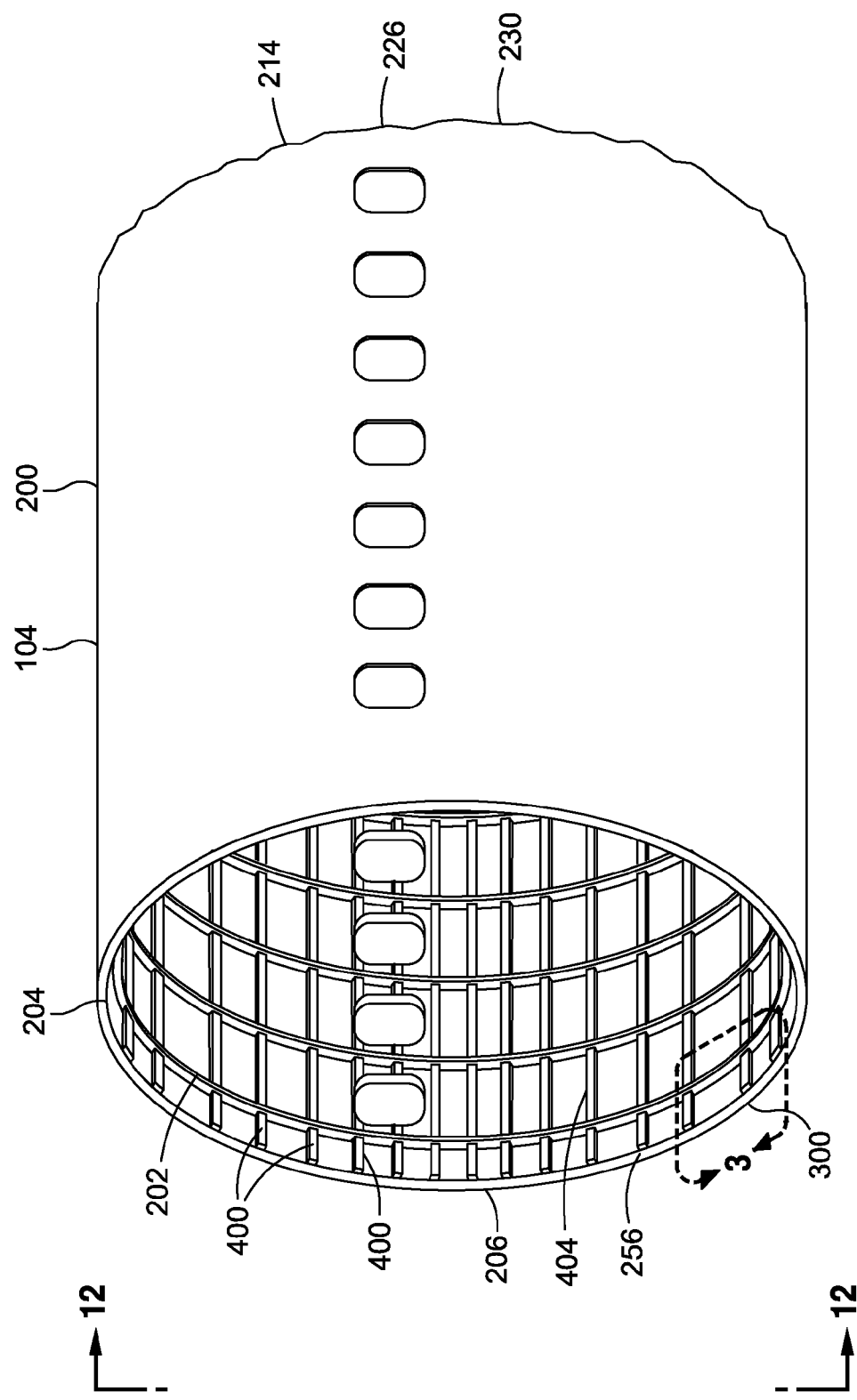
FIG. 2 is a perspective illustration of a barrel section of an aircraft fuselage taken along line 2 of FIG. 1.

Referring to FIG. 2, show is a perspective view of a portion of a barrel section 104 of a fuselage 102 (FIG. 1). The barrel section 104 may be formed as a composite structure 200 and may include one or more panels 206 (e.g., skin panels). Each panel 206 may be formed as a laminate 204 comprised of a plurality of composite plies 214. The panel 206 may be supported by a plurality of structural members 400. Each one of the structural members 400 may also be formed as a laminate 204 of a plurality of composite plies 214. In FIG. 2, the structural members 400 supporting the panel(s) 206 (e.g., skin panels) may comprise a plurality of circumferentially-spaced, longitudinally-extending stringers 402 or hat stiffeners 404 and a plurality of axially-spaced frames 202. In an embodiment, the hat stiffeners 404 may carry axial forces (not shown) such as axial tension loads (not shown), bending loads (not shown), and other loads. The frames 202 may maintain the shape of the fuselage 102 and may carry circumferential or hoop loads (not shown) and other loads. The frames 202 and the hat stiffeners 404 may enhance the buckling strength (not shown) of the fuselage 102 under bending (not shown). The frames 202 and the hat stiffeners 404 may also collectively increase the torsional and bending stiffness (not shown) of the panel(s) 206, among other qualities provided by the frames 202 and the hat stiffeners 404.

Figure 3:
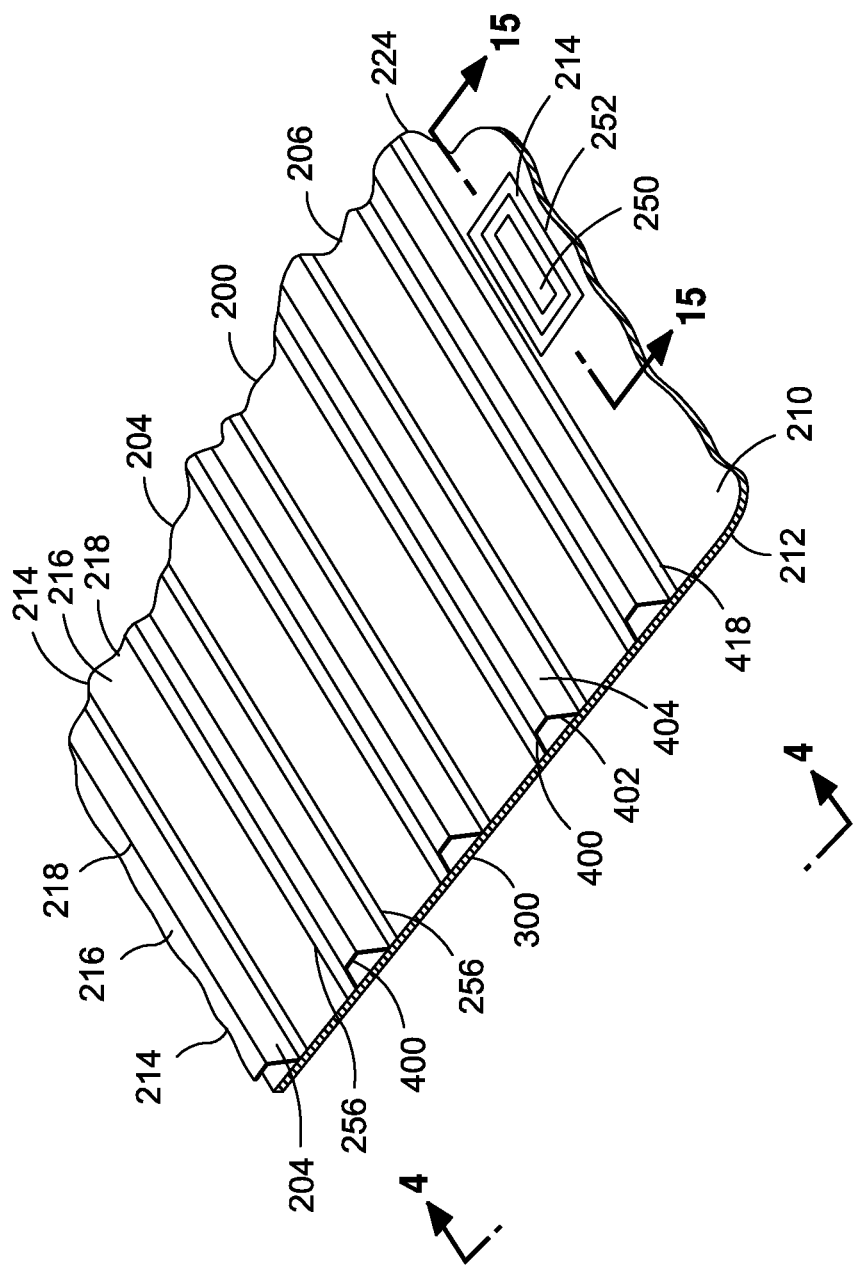
FIG. 3 is perspective illustration of a portion of a barrel section taken along line 3 of FIG. 2 and illustrating the barrel section comprised of a panel (e.g., skin panel) having structural members such as hat stiffeners mounted thereto.

Referring to FIG. 3, shown is a perspective view of a portion of the barrel section 104 (FIG. 1) illustrating a panel 206 having a plurality of structural members 400 (e.g., hat stiffeners 404) mounted to the panel 206 and forming a composite structure 200. In an embodiment, one or more of the structural members 400 (e.g., hat stiffeners 404) may be formed as a laminate 204 of composite plies 214 as was mentioned above. One or more of the structural members 400 may be secured to the panel 206 by bonding, co-bonding, or co-curing the structural members 400 to the panel 206 as described in greater detail below. As used herein, a structural member 400 may include a hat stiffener 404, a frame 202 (FIG. 2), a stringer (not shown), or any other structural member 400 of any configuration or geometry, without limitation, that may be joined to a panel 206. Advantageously, the composite structure 200 may include one or more ply stabilizers comprising stabilizing elements 300 configured to provide rigidity to the composite plies 214 and mitigate or prevent out-of-plane fiber distortion 244 (FIG. 6) during compaction, consolidation, or curing (not shown) of the composite structure 200 such as during compaction, consolidation, or curing of the composite structure 200.

Figure 4:
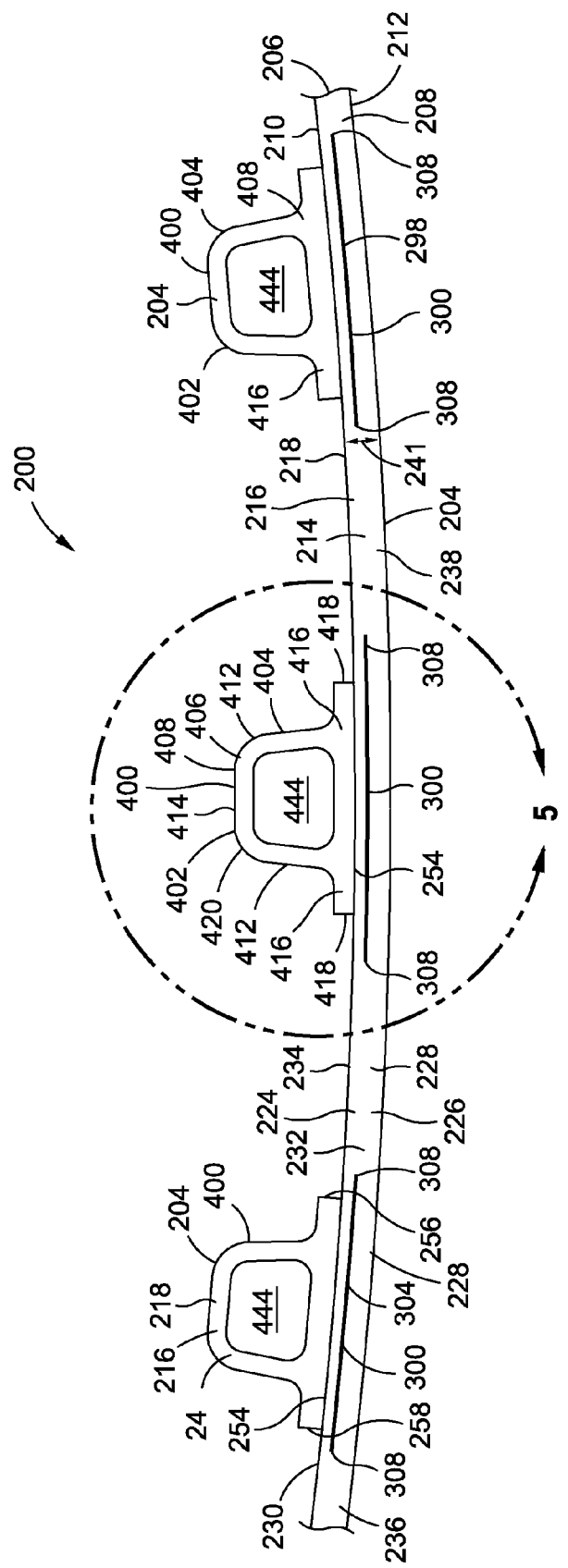
FIG. 4 is a cross-sectional illustration of a portion of the barrel section taken along line 4 of FIG. 3 and illustrating the hat stiffeners coupled to the panel.

Referring to FIG. 4, shown is a cross-sectional view of a barrel section 104 (FIG. 1) illustrating a plurality of the structural members 400 (e.g., hat stiffeners 404) mounted to the panel 206. Each one of the structural members 400 may represent at least one compression discontinuity 258 associated with the panel 206. In an embodiment, a compression discontinuity 258 may occur at locations where non-uniform compaction pressure 329 is applied to the panel 206. For example, a compression discontinuity 258 may occur at locations where a structural member 400 is mounted to a panel 206. FIG. 4 further illustrates stabilizing elements 300 that are advantageously included with the panel 206 laminate 204 and located proximate the one or more geometric discontinuities 256 that may be represented by each one of the structural members 400.

In the embodiment shown in FIG. 4, the stabilizing element 300 may be interleaved with (e.g., sandwiched between) a pair of the composite plies 214 of the panel 206. However, the stabilizing element 300 may be positioned on top (not shown) of a laminate upper surface 210 and/or on top (not shown) of a laminate lower surface 212 of the laminate 204. Advantageously, the stabilizing element 300 acts as a fiber distortion 244 (FIG. 6) mitigating element. In this regard, the stabilizing element 300 preferably has a relatively high stiffness or relatively high modulus of elasticity (e.g., high resistance to bending) which may constrain the composite plies 214 to remain substantially in-plane (not shown) and prevent out of plane fiber distortion 244 in the through-thickness direction 241 of the laminate 204 during compaction or consolidation of the laminate 204 as described in greater detail below.

In FIG. 4, the stabilizing element 300 may extend along at least a portion of a length (not shown) of the structural member 400. Each one of the stabilizing elements 300 may have opposing stabilizing element edges 308. The stabilizing element 300 (FIG. 4) may be sized and configured such that one or more of the stabilizing element edges 308 (FIG. 4) extend past the structural member edges 418. However, the stabilizing element 300 may be configured such that one or more of the stabilizing element edges 308 is non-extended past the structural member edges 418.

Figure 5:
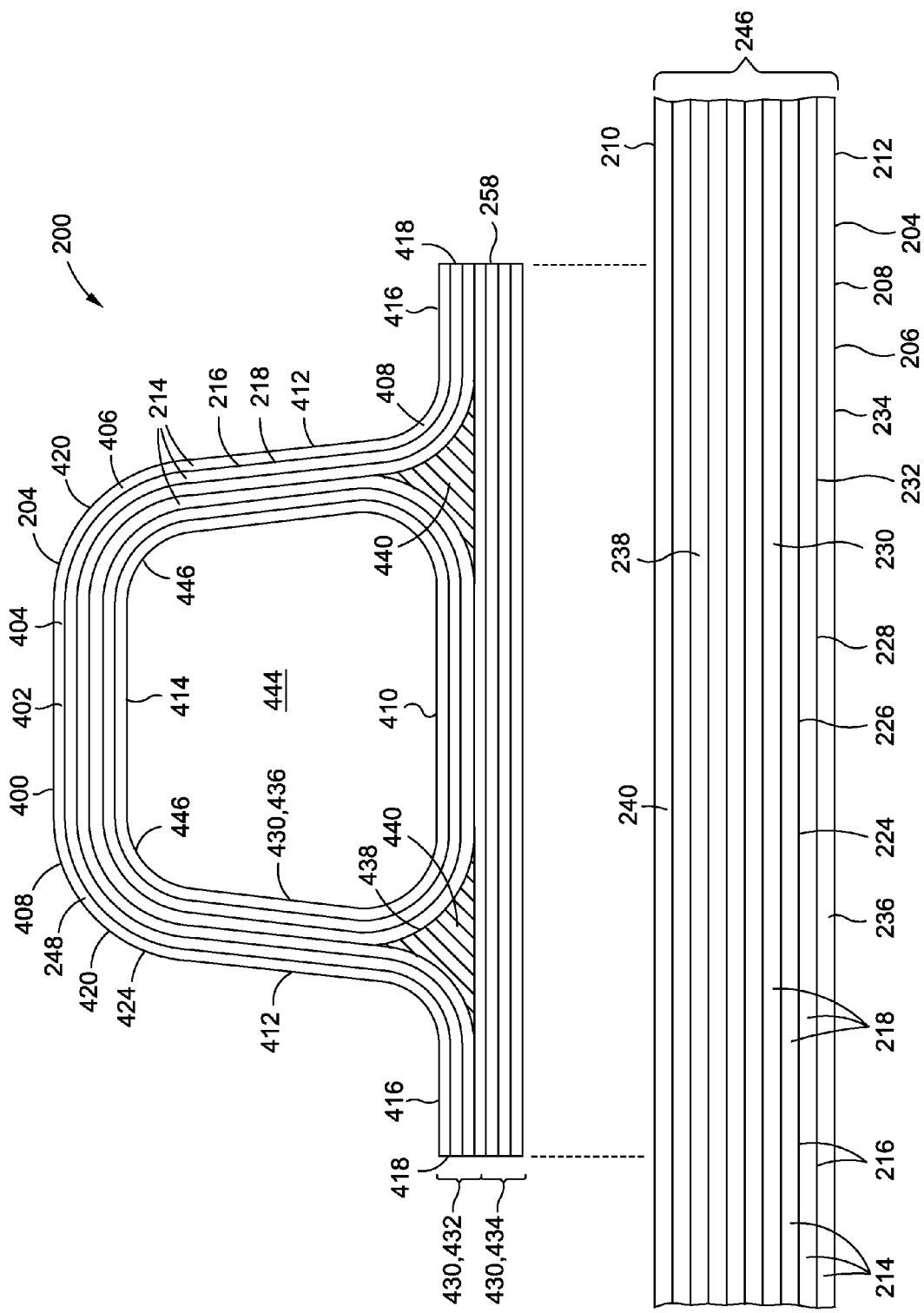
FIG. 5 is an exploded cross-sectional illustration of a structural member radius (i.e., a hat stiffener), a panel, and an adhesive layer taken along line 5 of FIG. 4 and illustrating the bonding of the hat stiffener to the panel.

Referring to FIG. 5, shown is an exploded view of a structural member 400 positioned above a panel 206 without the stabilizing element 300. Although the structural member 400 in FIG. 5 is shown in a hat stiffener 404 configuration, the structural member 400 may be provided in any one of a variety of different sizes, shapes, and configurations, without limitation. In the embodiment shown in FIG. 5, the structural member 400 (i.e., the hat stiffener 404) may be comprised of a plurality of the composite plies 214. However, the structural member 400 may be formed of any material including any metallic and/or non-metallic material, without limitation, and is not limited to being formed of composite plies 214.

In FIG. 5, the structural member 400 (e.g., the hat stiffener 404) may include a base portion 410 and may have a pair of upwardly extending webs 412 that may be interconnected by a cap 414. The base portion 410 may include flanges 416 on opposing ends of the base portion 410. Each one of the flanges 416 may terminate at a structural member edge 418. In an embodiment, the hat stiffener 404 may be comprised of a plurality of sub-laminates 430. For example, the structural member 400 may include a base laminate 434, a primary laminate 432, and a wrap laminate 436. The structural member 400 may include a radius filler 440 or noodle at a juncture 438 of the sub-laminates 430. The radius filler 440 may be comprised of unidirectional composite material (not shown) or other alternative materials.

In FIG. 5, in an embodiment, the structural member 400 may be formed as a laminate 204 of cured or pre-cured composite plies 218. However, the structural member 400 may be provided as a laminate 204 of uncured composite plies 216. Likewise, the panel 206 may be formed as a laminate 204 of uncured composite plies 216. However, the panel 206 may be provided as a laminate 204 of cured or pre-cured composite plies 218. In an embodiment, the composite plies 214 may be comprised of fiber-reinforced polymeric material 224 including relatively high modulus and high strength fibers 230 such as, without limitation, carbon fibers. However, the fibers 230 may be formed of fiber material 232 comprising graphite, glass, carbon, boron, ceramics, aramids, polyolefins, polyethylenes, polymers, tungsten carbide, and/or any other fiber material 232, without limitation. The fibers 230 of the composite plies 214 may be unidirectional or the fibers 230 may be woven or knitted in a fabric (not shown) arrangement.

In FIG. 5, the composite plies 214 may be pre-impregnated (e.g., pre-preg) with polymeric resin 226. However, the present disclosure is not limited to pre-preg composite plies 214 but may comprise composite structures 200 formed of dry or substantially dry fiber preforms (not shown) that may be laid up over a tool (not shown) and infused with liquid resin (not shown). In the present disclosure, the resin 226 may comprise thermosetting resin 226 such as epoxies and polyesters, or the resin 226 may comprise thermoplastic resin such as polyamides, polyolefins, fluoropolymers, and/or other resin material 228. The fibers 230 may have a fiber stiffness (not shown) in the range of from approximately 32 MSI (million pounds per square inch) to approximately 100 MSI. However, the fibers 230 may be provided with a fiber stiffness that is less than 32 MSI or greater than 100 MSI.

The fibers 230 may be provided with a fiber elongation 236 capability in the range of from approximately 0.1% to approximately 1% or greater of the original fiber length (not shown). However, the fibers 230 may be provided in any fiber elongation 236 capability. Each one of the composite plies 214 may be provided in a ply thickness 222 (FIG. 17)

in a range of from approximately 1 mil to approximately 20 mils and, more preferably, within a ply thickness 222 in a range of from approximately 4 mils to approximately 8 mils. However, the composite plies 214 may be provided in any ply thickness 222, without limitation. The laminate 204 for the structural member 400 and/or the panel 206 may be formed using conventional lay-up equipment (not shown) such as a tape laying machine (not shown) or the laminate 204 for the structural member 400 and/or the panel 206 may be formed by hand layup.

In FIG. 5, in an embodiment, one or more of the structural members 400 may be secured to the panel 206 by bonding, co-bonding, or co-curing the structural members 400 to the panel 206 as described in greater detail below. Co-bonding may comprise bonding one or more structural members 400 formed of cured or pre-cured composite plies 218 to a panel 206 formed of uncured composite plies 216 while simultaneously curing the panel 206 during the co-bonding process. Co-curing may comprise simultaneously curing one or more structural members 400 formed of uncured composite plies 216 and a panel 206 formed of uncured composite plies 216. The process of co-curing the structural member 400 and the panel 206 may include the application of heat and pressure for consolidating the uncured composite plies 216 of the structural member 400 and the panel 206 and may result in bonding the structural member 400 to the panel 206.

Figure 6:
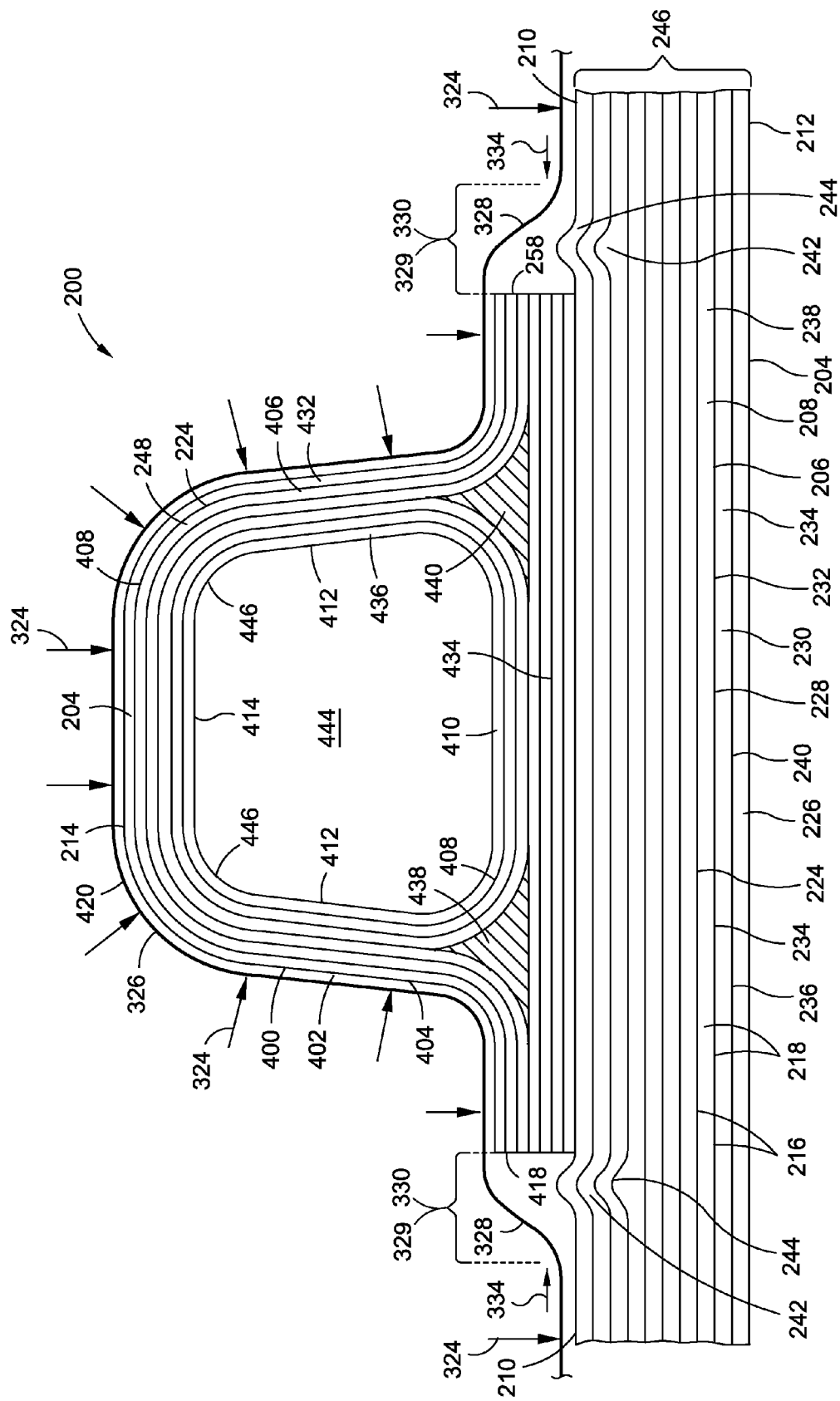
FIG. 6 is a cross-sectional illustration of the structural member of FIG. 5 being co-bonded to the panel and illustrating the application of pressure by a vacuum bag causing a region of low compaction pressure at a structural member edge of the structural member (i.e., at the edge of the hat stiffener) and resulting in out-of-plane distortion of the fibers of the panel.

Referring to FIG. 6, shown is a structural member 400 such as a hat stiffener 404 co-bonded to a panel 206 without a stabilizing element 300 such that FIG. 6 may illustrate the effect of non-uniform compaction pressure 329 on the panel 206. In FIG. 6, the structural member 400 may be co-bonded to the panel 206 using a vacuum bag 326 to apply compaction pressure 324 to form a composite structure 200. The application of compaction pressure 324 may include drawing a vacuum (not shown) on a vacuum bag 326 and/or positioning the vacuum-bagged composite structure 200 within an autoclave (not shown). As indicated above, the compaction pressure 324 may be applied during application of heat (not shown) which may result in a reduction in a viscosity (not shown) of the resin 226. The reduction in the resin 226 viscosity may allow the resin 226 in the composite plies 214 to flow and intermingle with resin 226 in adjacent composite plies 214.

As shown in FIG. 6, the vacuum bag 326 may result in a compaction pressure 324 that may be applied to the composite plies 214 of the structural member 400 and the panel 206. The structural member 400 may include a mandrel 444 that may be temporarily or permanently installed during the application of the compaction pressure 324. For example, the mandrel 444 may be formed of foam (not shown) or the mandrel 444 may comprise an inflatable bladder (not shown) that may be temporarily installed to maintain the shape of the structural member 400 during the application of the compaction pressure 324. However, the mandrel 444 may be permanently installed in the structural member 400.

In FIG. 6, the structural member 400 may represent a compression discontinuity 258 associated with the panel 206 at each one of the structural member edges 418. For example, the structural member 400 may result in the application of non-uniform compaction pressure 329 to the panel 206. In this regard, each one of the structural member edges 418 may result in the formation of a region of low compaction pressure 330 caused by bridging 328 of the vacuum bag 326 from the structural member edge 418 to the laminate upper surface 210. The reduced viscosity of the resin 226 during the application of compaction pressure 324 may result in the resin 226 flowing along a direction of resin flow 334 toward the region of low compaction pressure 330.

The flowing of the resin 226 may cause the fibers 230 to move along the direction of resin flow 334 which may result in the localized bunching up of the fibers 230 in a bow wave 242 in the region of low compaction pressure 330. The bow wave 242 may represent out-of-plane fiber distortion 244 in the fibers 230 of one or more of the composite plies 214. Upon curing and solidification of the resin 226, the out-of-plane fiber distortion 244 may become permanently fixed in the composite structure 200. The out-of-plane fiber distortion 244 may affect the load-carrying capability of the composite plies 214.

Figure 7:
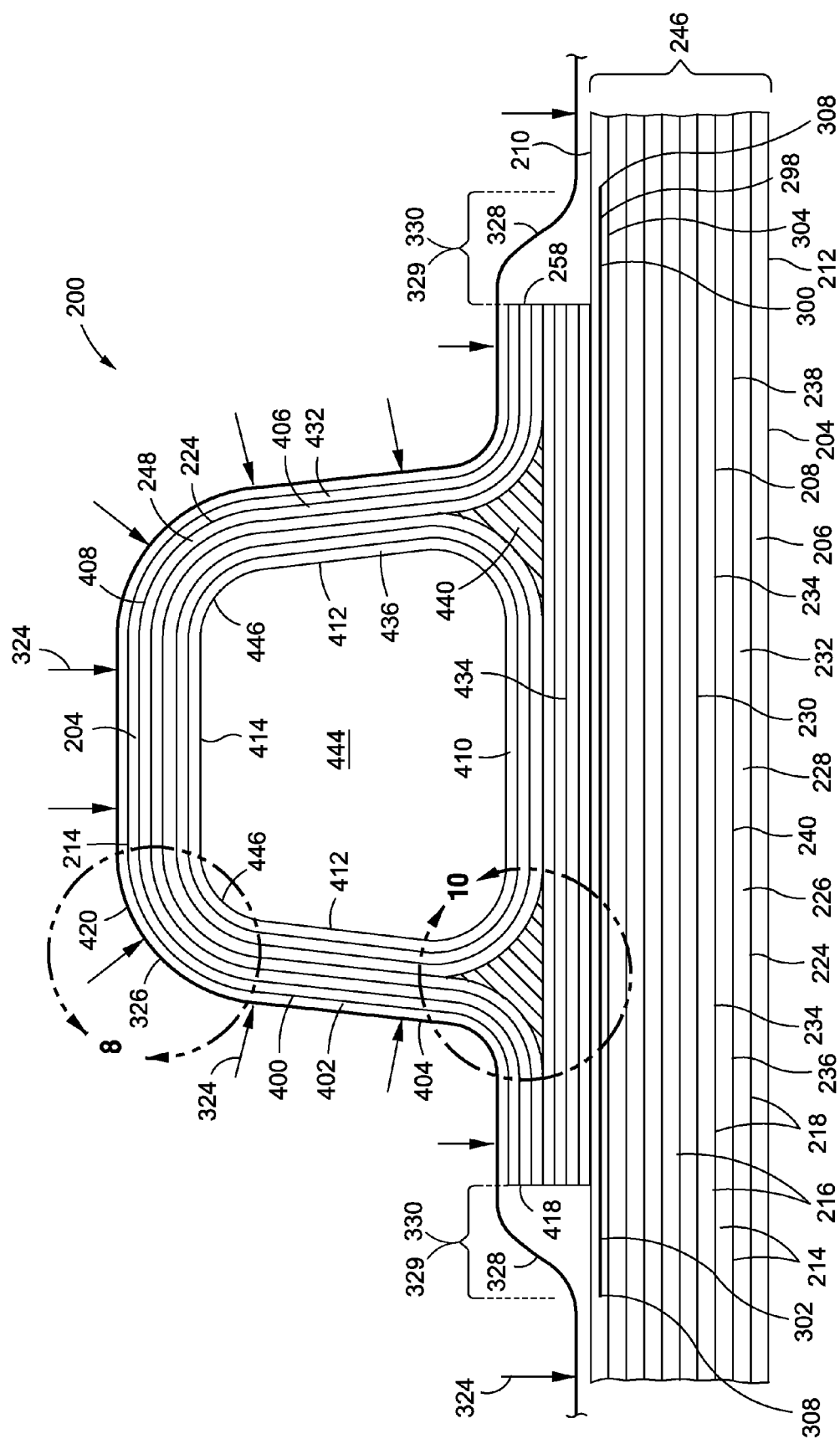
FIG. 7 is a cross-sectional illustration of the structural member and the panel of FIG. 6 having a stabilizing element installed in the panel proximate the edge of the structural member and resulting in the minimizing of out-of-plane fiber distortion in the panel.

Referring to FIG. 7, shown is an embodiment of a composite structure 200 advantageously having a stabilizing element 300 provided with the laminate 204 of the panel 206. In the region of low compaction pressure 330, the stabilizing element 300 mitigates or prevents out-of-plane fiber distortion 244 (FIG. 6) such that the composite plies 214 are advantageously maintained in an in-plane fiber direction 240. The stabilizing element 300 may be formed of a material having relatively high stabilizing element stiffness 302 at composite processing temperatures (e.g., the curing temperature or the consolidation temperature). The relatively high stabilizing element stiffness 302 of the stabilizing element 300 may resist the generation of a bow wave 242 (FIG. 6) and reduce or mitigate out-of-plane fiber distortion 244 (FIG. 6). In this regard, the stabilizing element 300 may act as a fiber distortion mitigating element which may improve the load-carrying capability of the composite structure 200 relative to the load-carrying capability of a composite structure having out-of-plane fiber distortion 244.

In FIG. 7, the stabilizing element 300 may be provided in a size, shape, and configuration that extends at least partially across the regions of low compaction pressure 330. More particularly, the stabilizing element 300 may have opposing stabilizing element edges 308. The stabilizing element 300 may be configured such that at least one of the stabilizing element edges 308 extends beyond a structural member edge 418. Furthermore, the stabilizing element 300 may be configured such that that at least a portion of the stabilizing element 300 extends across the region of low compaction pressure 330. For example, the stabilizing element 300 may be provided in a width such that at least one of the stabilizing element edges 308 extends beyond a structural member edge 418 by an amount at least approximately equal to a laminate thickness 246 of the laminate 204. Even further, although FIG. 7 illustrates the stabilizing element 300 extending across an entirety of the structural member 400, the composite structure 200 may be provided in two separate stabilizing elements 300 (not shown) wherein each stabilizing element 300 may be positioned proximate one of the structural member edges 418 and extending across one of the regions of low compaction pressure 330.

In the embodiment shown in FIG. 7, the stabilizing element 300 may be located proximate a laminate upper surface 210. For example, the stabilizing element 300 may be interleaved within (e.g., sandwiched between) the composite plies 214 of the laminate 204 and may be located at a depth 322 (FIG. 17) of no more than approximately ten of the composite plies 214 below the laminate upper surface 210. In a further embodiment, the stabilizing element 300 may preferably be located at a depth 322 of no more than approximately three of the composite plies 214 below the laminate upper surface 210. Although FIG. 7 illustrates a single one of the stabilizing elements 300 installed within in a stack of the composite plies 214 of the laminate 204, any number of stabilizing elements 300 may be installed within in a stack of the composite plies 214. In addition, although the stabilizing element 300 is shown as a relatively flat, thin, homogenous sheet having a relatively constant stabilizing element thickness 306 (FIG. 17), the stabilizing element 300 may be provided in alternative configurations including a simply curved shape (not shown—e.g., cylindrical, conical) or complex contoured shape (not shown—e.g., a doubly-curved shape of an aircraft nose) to match a simply-curved shape (not shown) or complex contoured shape (not shown) of the composite plies 214 of the stabilizing element 300, and may have a non-uniform thickness (not shown).

In FIG. 7, the stabilizing element 300 may advantageously be formed of a stabilizing element material having a stabilizing element stiffness 302 (e.g., stabilizing element modulus of elasticity) at the processing or curing temperature of the composite plies 214 that is higher than the composite laminate stiffness 234 at the processing or curing temperature of the composite plies 214. For composite plies 214 formed of thermosetting material, the stabilizing element 300 may be formed of a stabilizing element material having a stabilizing element stiffness 302 at a curing temperature of approximately 250 F (Fahrenheit) to 350 F or higher. For composite plies 214 formed of thermoplastic material, the stabilizing element 300 may be formed of a stabilizing element material having a stabilizing element stiffness 302 at a processing (e.g., consolidating) temperature of approximately 600 F to 720 F or higher. The stabilizing element 300 may be formed of a stabilizing element material have a stabilizing element stiffness 302 in the range of from approximately 15 MSI to approximately 80 MSI as indicated above although the stabilizing element 300 may be formed of any stabilizing element material having a stabilizing element stiffness 302 that is larger or smaller than the 15-80 MSI range. In an embodiment, the stabilizing element 300 may be formed of molybdenum having a stabilizing element stiffness 302 of approximately 47 MSI at the curing temperature of approximately 350 F typically associated with carbon epoxy materials. Advantageously, the stabilizing element 300 is also preferably a relatively inert material exhibiting minimal galvanic corrosion in the presence of graphite epoxy or other composite materials.

Referring still to FIG. 7, the stabilizing element 300 may be formed of stabilizing element material having a coefficient of thermal expansion (CTE) 304 that is comparable to the in-plane laminate CTE 238 of the composite laminate 204. For example, as indicated above, the stabilizing element 300 may be formed of molybdenum which may have a stabilizing element CTE 304 in the range of approximately $2.5 \times 10^{-6}$ to $3.5 \times 10^{-6}$ inch/inch/° F. (degree Fahrenheit) at a composite curing temperature of 350 F and which may compare favorably with the laminate CTE 238 which may be in the range of from approximately $0.5 \times 10^{-6}$ to $6.0 \times 10^{-6}$ inch/inch/° F. However, depending upon the stabilizing element material, the stabilizing element 300 may have a stabilizing element CTE 304 that is larger or smaller than the range of $2.5 \times 10^{-6}$ to $3.5 \times 10^{-6}$ inch/inch/° F. In an embodiment, the stabilizing element 300 may have a stabilizing element CTE 304 that is substantially equivalent to the laminate CTE 238. For example, the stabilizing element 300 may have a stabilizing element CTE 304 that is within at least ten percent of the laminate CTE 238 at the curing (e.g., processing, consolidating) temperature to minimize distortion or residual stress (not shown) that may otherwise occur in the laminate 204 during the curing and/or consolidating process.

The stabilizing element 300 may be formed of stabilizing element material comprising a metallic material, a non-metallic material, or any other relatively high modulus material at composite processing temperatures (e.g., curing temperature, solidification temperature, etc.). For example, the metallic material may comprise molybdenum, iron, and/or titanium, or any alloy thereof or other materials (e.g., Invar, steel). The stabilizing element 300 may also be formed of a non-metallic material such as a cured composite material and/or a ceramic material. In this regard, the stabilizing element 300 may be formed of a material having a relatively high stiffness, a relatively low coefficient of thermal expansion, minimal galvanic corrosion in the presence of composite materials, and which retains its mechanical properties at the curing temperatures associated with the laminate 204. The stabilizing element 300 may also preferably have a relatively high thermal conductivity for improving heat flow through the laminate 204 during curing to assist in uniform heat distribution during curing of the laminate 204.

Referring to FIG. 8, shown is an example of a geometric discontinuity 256 that may be associated with the structural member 400 which may be formed as a laminate 204 of uncured composite plies 216. The geometric discontinuity 256 may comprise a cross-sectional shape-change 408 in the form of a structural member radius 420 at the intersection of the web 412 and the cap 414 of the hat stiffener 404. The structural member radius 420 may result in a compression discontinuity 258 in the structural member 400. For example, a region of high compaction pressure 332 may at a male radius 446 of the mandrel 444 relative to the compaction pressure 324 occurring at structural member 400 locations outside of the structural member radius 420 and resulting in differential pressure with regard to the region of high compaction pressure 332. The region of high compaction pressure 332 may occur during vacuum bagging and/or autoclaving of the structural member 400. The localized region of high compaction pressure 332 may result in radius thinning 428 in the structural member radius 420 relative to the nominal structural member thickness 426 of the structural member 400.

In FIG. 8, the radius thinning 428 may occur due to the flow (not shown) of resin 226 away from the structural member radius 420. The radius thinning 428 may have an undesirable effect on the fit-up of the structural member 400 with mating components (not shown). In addition, the radius thinning 428 may have an effect on the pull-off (not shown) capability of the structural member 400 and/or the bending load (not shown) capability of the structural member 400. In this regard, a stabilizing element 300 may advantageously be included at any location in any laminate 204 (e.g., a panel 206, a structural member 400) having a simply curved shape (not shown—e.g., simple cylindrical or conical shape) and/or in any laminate 204 having a complex contoured shape (not shown—e.g., aircraft nose shape, wing-fuselage fairing shape, etc.).

Referring to FIG. 9, shown is a stabilizing element 300 located proximate the structural member radius 420. Advantageously, the stabilizing element 300 has a relatively high stiffness which may result in distributing the compaction pressure 324 that is applied by the vacuum bag 326 to the structural member 400. The stabilizing element 300 may minimize or eliminate the region of high compaction pressure 332 (FIG. 8) that otherwise causes resin 226 flow (not shown) and which may otherwise cause radius thinning 428 (FIG. 8) in the structural member radius 420.

In the embodiment shown in FIG. 9, the stabilizing element 300 may be located proximate an outer surface 424 of the structural member radius 420. However, the stabilizing element 300 may be located at any location within the laminate 204 of the structural member 400. For example, the stabilizing element 300 may be located on top of an outer surface 424 of the structural member radius 420 or at any other location within the composite plies 214. Although FIG. 9 illustrates a single one of the stabilizing elements 300 installed within the composite plies 214 in the structural member radius 420, any number of stabilizing elements 300 may be installed within the composite plies 214. The stabilizing element 300 may be sized and configured such that the stabilizing element edges 308 extend beyond the structural member radius tangent points 422. However, the stabilizing element 300 may be sized and configured such that both of the stabilizing element edges 308 are within the structural member radius tangent points 422, or such that only one of the stabilizing element edges 308 is between the structural member radius tangent points 422. Although FIG. 9 illustrates the stabilizing element 300 located on a male radius 446, the disclosed embodiments include installation of a stabilizing element 300 proximate a female radius (not shown) of a structural member 400.

Referring to FIG. 10, shown is a further example of a geometric discontinuity 256 that may be formed in a structural member 400 at a juncture 438 of two or more sub-laminates 430. In FIG. 10, the geometric discontinuity 256 comprises a noodle or radius filler 440 located at the juncture 438 of the base laminate 434, the primary laminate 432, and the wrap laminate 436 that make up the laminate 204 of the hat stiffener 404. The radius filler 440 may result in out-of-plane fiber distortion 244 in the composite plies 214 located adjacent to the radius filler 440. The out-of-plane fiber distortion 244 may occur during curing of the structural member 400 and during application of compaction pressure 324 to the structural member 400.

Referring to FIG. 11, shown is a stabilizing element 300 located proximate the radius filler 440 and installed within the base laminate 434 of the structural member 400 proximate the radius filler 440. Advantageously, the stabilizing element 300 may minimize or prevent out-of-plane fiber distortion 244 (FIG. 10) in the composite plies 214 (FIG. 10). In this regard, the stabilizing element 300 may improve the strength and stiffness characteristics of the structural member 400. In addition, by minimizing out-of-plane fiber distortion 244 in the composite plies 214 adjacent to the radius filler 440, the pull-off capability (not shown) of the hat stiffener 404 or the pull-off capability (not shown) of other types of stringers 402 or structural members 400 may be improved. In the embodiment shown, the stabilizing element 300 may be sized and configured such that the stabilizing element edges 308 extend past the radius filler tangent points 442. However, the stabilizing element 300 may be provided in any width that may mitigate or minimize out-of-plane fiber distortion 244.

Figure 12:
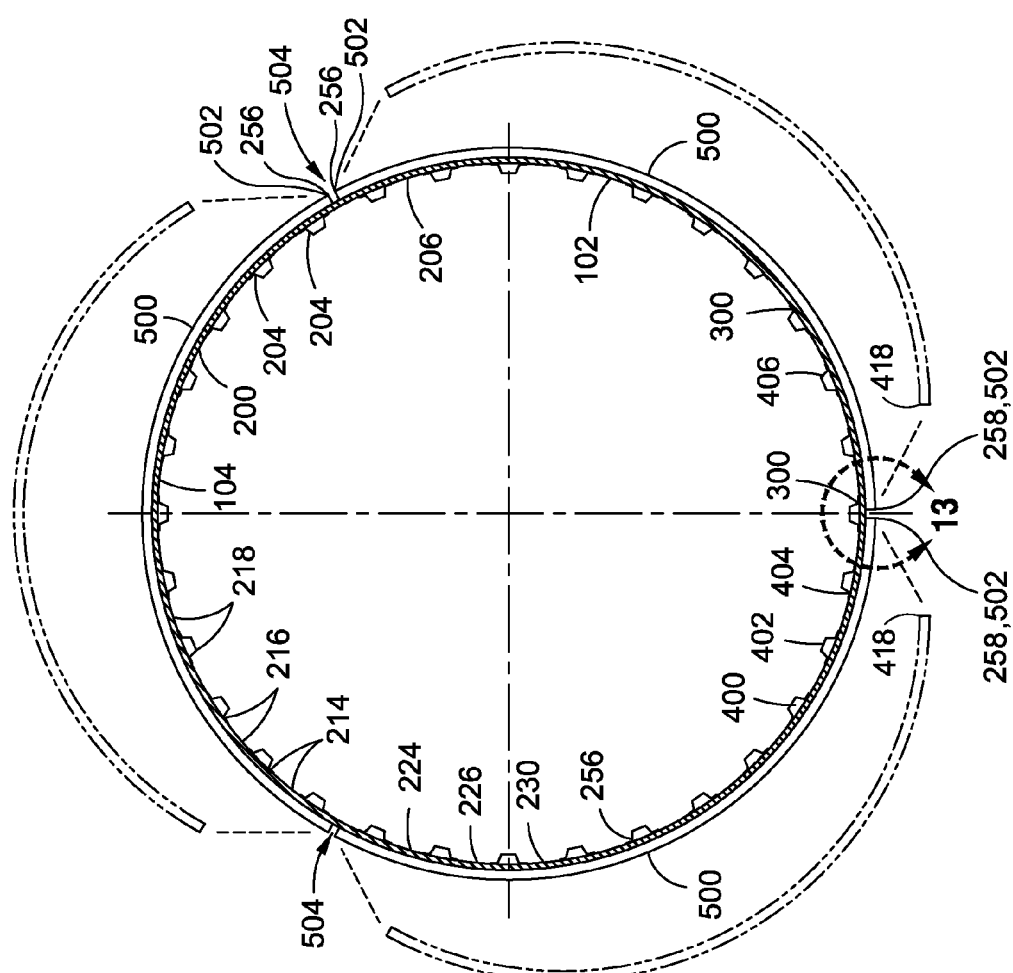
FIG. 12 is an end view illustration of the composite barrel taken along line 12 of FIG. 2 and illustrating a plurality caul plates for mounting to the skin panel of the barrel section.

Referring to FIG. 12, shown is an example of a compression discontinuity 258 occurring as a result of the application of caul plates 500 to a panel 206 of the barrel section 104. Due to the relatively large size of the barrel section 104, multiple caul plates 500 may be required. FIG. 12 illustrates three of the caul plates 500 removably positionable against the panel 206 to provide a surface against which the panel 206 may be compacted under the compaction pressure 324 (FIG. 11) applied by a vacuum bag 326 (FIG. 11) (not shown) on an opposite side of the panel 206. The caul plate 500 may be formed of relatively stiff material and may be provided as an aid in controlling an outer mold line (not shown) and surface finish of the final composite structure 200. To accommodate thermal expansion of the caul plates 500 during heating of the barrel section 104, the caul plates may be sized and configured to provide for caul plate gaps 504 between the caul plate edges 502 of the caul plates 500.

Referring to FIG. 13, shown is a portion of the panel 206 of a barrel section 104 at a caul plate gap 504 between adjacent caul plates 500 and wherein the hat stiffener 404 (FIG. 12) is omitted for clarity. A vacuum bag 326 may be applied on an opposite side of the panel 206 for application of compaction pressure 324 to the panel 206 for consolidation thereof. The caul plate gap 504 between the caul plate edges 502 may result in a region of low compaction pressure 330. The region of low compaction pressure 330 may cause out-of-plane fiber distortion 244 in the composite plies 214.

Referring to FIG. 14, shown is a stabilizing element 300 located proximate the gap 504 between the caul plate edges 502. Advantageously, the stabilizing element 300 may be installed within the laminate 204 of composite plies 214. Due to the stabilizing element stiffness 302 of the stabilizing element 300, the stabilizing element 300 may constrain the composite plies 214 to remain substantially in-plane during the application of compaction pressure 330 (FIG. 13). In this manner, the stabilizing element 300 may prevent out-of-plane fiber distortion 244 (FIG. 13) during vacuum bagging and/or autoclaving. In addition, the stabilizing element 300 may minimize or prevent the occurrence of visible mark-off (not shown).

Referring to FIG. 15, shown is an example of a geometric discontinuity 256 in the form a pad-up 250 that may be formed with the panel 206. The pad-up 250 may comprise a local increase in a quantity of the composite plies 214 of the panel 206. For example, the laminate 204 may be formed in a substantially constant thickness and may have a pad-up 250 comprising a localized composite ply 214 build-up on the laminate 204. A pad-up 250 may be provided in areas of a panel 206 around joints (not shown), holes (not shown), cutouts (not shown), and other features that may constitute stress risers (not shown) in the laminate 204. In this regard, a pad-up 250 may be included with the panel 206 to locally reinforce the panel 206 to accommodate the mounting or mating of components (not shown) to the laminate, or to increase the local stiffness or strength of the laminate 204.

In FIG. 15, although the pad-up 250 is shown as a gradual or stepwise increase or buildup in the quantity of composite plies 214, the pad-up 250 may comprise any thickness variation in the laminate thickness 246. For example, the pad-up 250 may be provided as an abrupt increase in the laminate thickness 246 or a change in the cross-sectional profile of the composite structure 200. It should also be noted that although the panel 206 in FIG. 15 is illustrated as having a planar configuration, the panel 206 may be formed in a contoured or curved configuration (not shown), or as a combination of a planar configuration and a contoured or curved configuration.

Referring to FIG. 16, shown is a stabilizing element 300 located proximate a perimeter edge 252 of the pad-up 250 (FIG. 15). The stabilizing element 300 may be installed within the laminate 204 (FIG. 15) of composite plies 214. For example, the stabilizing element 300 may be installed proximate a perimeter edge 252 of the pad-up 250. The stabilizing element 300 may be configured such that the stabilizing element edges 308 extend beyond the perimeter edge 252. In the embodiment shown, the stabilizing element 300 may be configured such that each one of the stabilizing element edges 308 extends beyond the perimeter edge 252 of the pad-up 250. Although a single stabilizing element 300 is shown, one or more stabilizing elements 300 may be installed at one or more of the perimeter edges 252 of the pad-up 250.

Referring to FIG. 17, shown is a cross-sectional illustration of a laminate 204 having a stabilizing element 300 and a composite ply 214 located in a common plane 316 and wherein the stabilizing element edges 308 and the ply edges 220 are disposed in opposing relation 320 to one another. In an embodiment, the stabilizing element 300 may be provided in a stabilizing element thickness 306 that is approximately equivalent to a multiple of a ply thickness 222 of the composite plies 214 located immediately adjacent to the stabilizing element 300. In an embodiment, the stabilizing element thickness 306 may be approximately equivalent to a ply thickness 222. In a further embodiment, the stabilizing element thickness 306 may be approximately two or more of the ply thicknesses 222. The ply thickness 222 may be measured after compaction of the composite plies 214. As indicated above, the composite plies 214 may have a ply thickness 222 in a range of from approximately 1 mil to approximately 20 mils or larger. However, the ply thickness 222 may be provided in a range of from approximately 4 mils to approximately 8 mils. The stabilizing element 300 may have a stabilizing element thickness 306 in a range of from approximately 1 mil to approximately 20 mils although the stabilizing element thickness 306 may be larger than 20 mils.

Referring to FIG. 18, shown is a cross-sectional illustration of a laminate 204 having a stabilizing element 300 and wherein at least one of the composite plies 214 is arranged such that the stabilizing element edges 308 and the ply edges 220 are disposed in overlapping relation 318 to one another. In this regard, the laminate 204 is configured such that at least one of the composite plies 214 in a common plane 316 with the stabilizing element 300 is extended up and over the stabilizing element edges 308 and overlapping the stabilizing element edges 308. However, the panel 206 may be arranged in any one of a variety of combinations of overlapping relation 318 and/or opposing relations 320 of the stabilizing element edges 308 and ply edges 220.

In an embodiment shown in FIGS. 17-18, the stabilizing element 300 may be bonded to one or more of the composite plies 214. For example, an adhesive layer 314 may be included in the laminate 204 between the stabilizing element 300 and at least one of the composite plies 214. The adhesive layer 314 may comprise an adhesive material such as a thermosetting epoxy resin or a thermoplastic resin. The adhesive material may also comprise polyimide resin, bismaleimide resin, polyurethane adhesive, acrylic resin, or any other suitable resin, without limitation. In an embodiment, the adhesive layer 314 may have a thickness in a range of from approximately 0.5 mil to 2.0 mils or larger. The adhesive layer 314 may advantageously facilitate bonding of the stabilizing element 300 with one or more immediately adjacent composite plies 214. A surface treatment 312 may be applied to one or more of the stabilizing element surfaces 310 of the stabilizing element 300 to improve bonding between the stabilizing element 300 and at least one of the composite plies 214.

Figure 19:
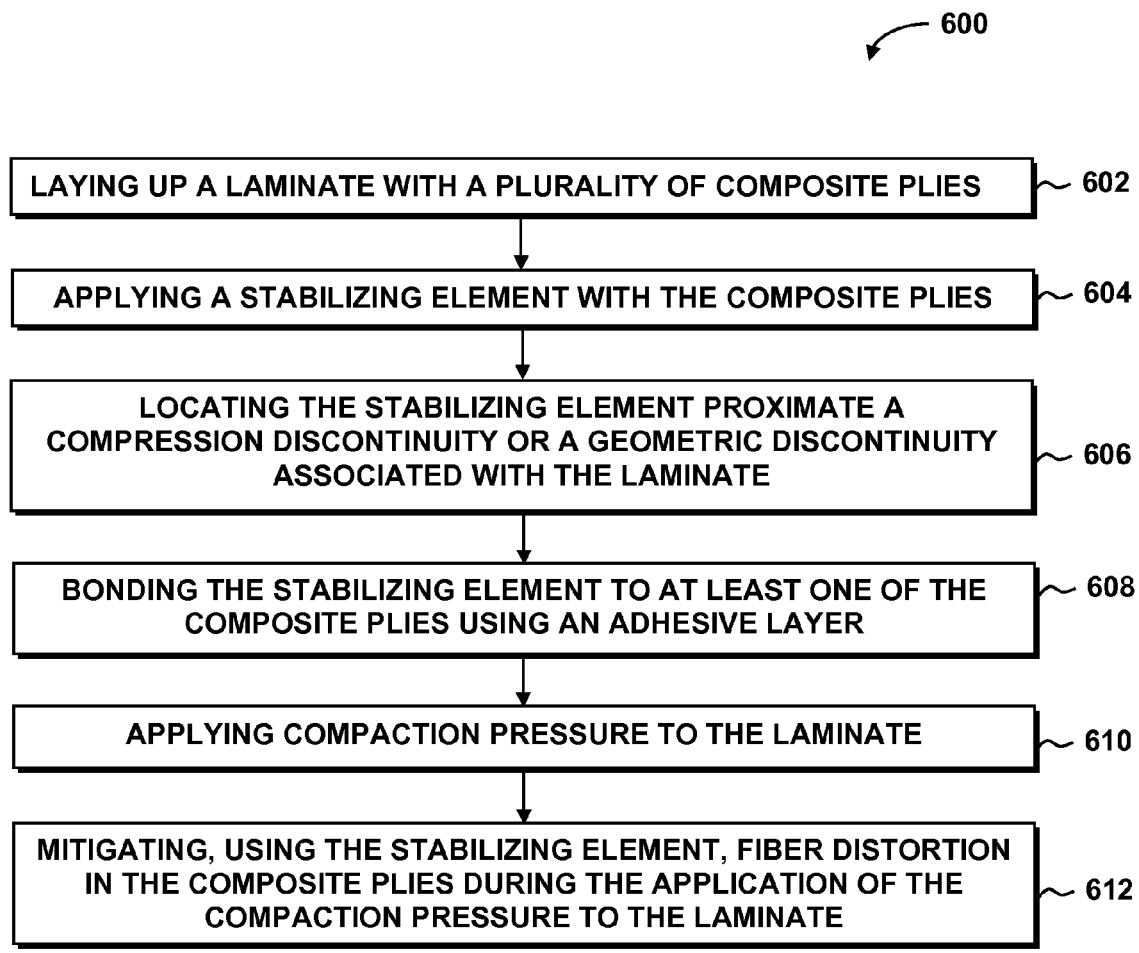
FIG. 19 is an illustration of a flow diagram having one or more operations that may be included in a method of manufacturing a composite structure.
Figure 20:
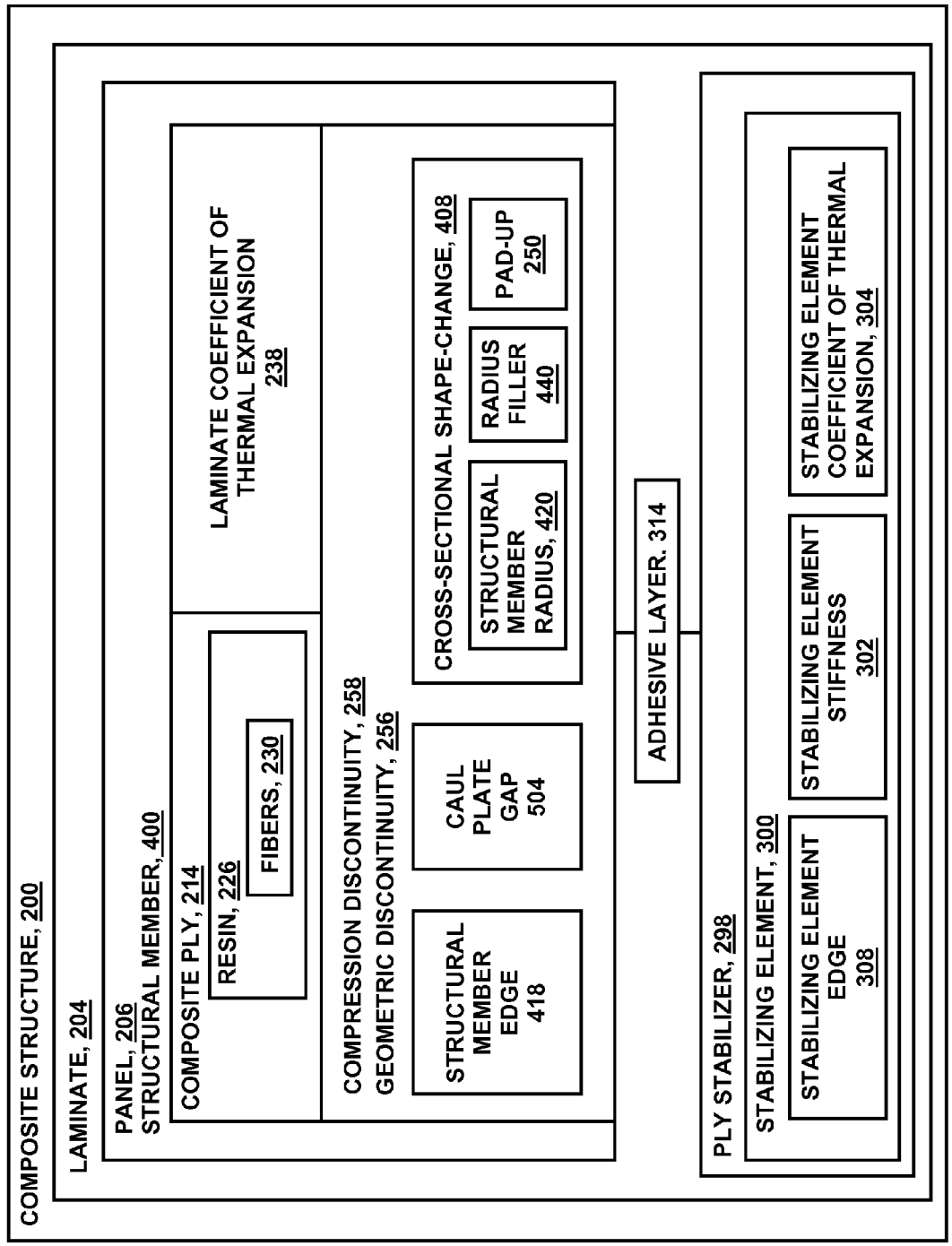
FIG. 20 is an illustration of a block diagram of a composite structure having at least one stabilizing element.

Referring to FIG. 19, shown is an illustration of a flow diagram of an embodiment of a method 600 of manufacturing a composite structure 200 (FIG. 20). Step 602 of the method 600 may comprise laying up a laminate 204 (FIG. 20) with a plurality of composite plies 214 (FIG. 20) wherein the laminate 204 may have a compression discontinuity 256 (FIG. 20) and/or a geometric discontinuity 256 (FIG. 20) associated therewith. The process of laying up the laminate 204 may be performed using conventional lay-up equipment such as a tape laying machine (not shown), and/or the laminate 204 may be laid up by hand. The laminate 204 may comprise a structural member 400 (FIG. 20) formed of a plurality of cured or pre-cured composite plies 218 (FIG. 20) and configured in a desired cross-sectional shape such as the hat stiffener 404 illustrated in FIG. 5 or in any other cross-sectional shape, without limitation.

Alternatively, the laminate 204 (FIG. 20) may be formed as a structural member 400 (FIG. 20) comprising a plurality of uncured composite plies 216 (FIG. 20). In a further embodiment, the laminate 204 may be formed as a panel 206 (FIG. 20) comprising a plurality of uncured composite plies 216 that may be co-cured with one or more structural members 400. The panel 206 may be provided in a generally planar configuration and/or in a curved configuration such as in the barrel section 104 shown in FIG. 2. A composite structure 200 (FIG. 20) may also be formed by co-bonding one or more structural members 400 (FIG. 20) formed of cured or pre-cured composite plies 218 (FIG. 20) to a panel 206 formed of uncured composite plies 216 while simultaneously curing the panel 206 during a co-bonding process.

Step 604 of the method 600 of FIG. 19 may include applying at least one stabilizing element 300 (FIG. 20) with the composite plies 214 (FIG. 20). For example, one or more of the stabilizing elements 300 may be installed with the composite plies 214 of the laminate 204 (FIG. 20) as shown in FIGS. 7, 9, 11, 14, and 16. In an embodiment, the stabilizing element 300 may be located at a depth 322 (FIG. 17) of no more than approximately ten of the composite plies 214 below a laminate upper surface 210 (FIG. 17) or laminate lower surface 212 (FIG. 17). More preferably, the stabilizing element 300 may be located at a depth 322 of no more than approximately two or three of the composite plies 214 below the laminate upper surface 210 or laminate lower surface 212. Alternatively, the method may include applying the stabilizing element 300 on top (not shown) of the laminate upper surface 210 and/or on top (not shown) of the laminate lower surface 212.

Step 606 of the method 600 of FIG. 19 may include locating the stabilizing element 300 (FIG. 7) proximate a compression discontinuity 256 (FIG. 20) and/or a geometric discontinuity 256 (FIG. 20) associated with the laminate 204 (FIG. 7). For example, the stabilizing element 300 may be located proximate a structural member edge 418 of a structural member 400 (FIG. 7) that may be mounted to a panel 206 (FIG. 7). In this regard, the structural member edge 418 may result in the occurrence of a compression discontinuity 258 associated with the panel 206. The method may include positioning the stabilizing element 300 relative to the structural member 400 (FIG. 7) such that a stabilizing element edge 308 (FIG. 7) extends beyond the structural member edge 418 (FIG. 7) of the structural member 400. For example, the stabilizing element 300 may be located such that the stabilizing element 300 extends across a region of low compaction pressure 330 as may be caused by bridging 328 (FIG. 7) of a vacuum bag 326 (FIG. 7) as described above.

Step 606 of the method 600 may also include locating the stabilizing element 300 (FIG. 9) proximate one or more other types of compression discontinuities 258 (FIG. 20) and/or geometric discontinuities 256 (FIG. 9) that may be associated with a structural member 400 (FIG. 9). For example, one or more stabilizing elements 300 may be located proximate a cross-sectional shape-change 408 (FIG.

9) in a structural member cross-section 406 (FIG. 9) of a structural member 400. FIG. 9 illustrates a stabilizing element 300 located proximate a structural member radius 420 (FIG. 9) of a structural member cross-section 406. The stabilizing element 300 may be positioned proximate an outer surface 424 (FIG. 9) of the structural member radius 420 to promote a uniform distribution of compaction pressure 324 (FIG. 9) throughout the laminate 204 (FIG. 9). The stabilizing element 300 may thereby minimize or prevent the occurrence of a region of high compaction pressure 332 (FIG. 8) that may otherwise result in differential pressure with regard to the relatively lower compaction pressure 324 on the structural member 400 at locations adjacent to the structural member radius 420. Such regions of high compaction pressure 332 (FIG. 8) that may otherwise cause resin 226 to flow (not shown) away from the structural member radius 420 and may result in radius thinning 428 (FIG. 8) in the structural member radius 420. As shown in FIG. 11, in an embodiment, the stabilizing element 300 may also be located proximate a geometric discontinuity 256 comprising a radius filler 440 at a juncture 438 of a plurality of sub-laminates 430 of the structural member 400 as described above.

Step 608 of the method 600 of FIG. 19 may include bonding the stabilizing element 300 to at least one of the composite plies 214 (FIG. 17) using an adhesive layer 314 (FIG. 17). The bond between the stabilizing element 300 (FIG. 17) and the composite plies 214 may be enhanced by applying a surface treatment 312 (FIG. 17) to one or more of the stabilizing element surfaces 310 (FIG. 17) of the stabilizing element 300. In an embodiment, the surface treatment 312 may comprise chemically treating the stabilizing element surfaces 310 such as by applying a sol-gel surface treatment (not shown), chemical cleaning, chemical etching, and solvent wiping, or by mechanically treating the stabilizing element surfaces 310 by grit blasting, sanding, sandblasting, abrading, laser ablation, or any one of a variety of other surface treatments 312. Step 608 may include applying a stabilizing element 300 with the composite plies 214 of the laminate 204 such that the stabilizing element 300 and one of the composite plies 214 are located on a common plane 316 and a stabilizing element edge 308 and a ply edge 220 are in generally opposing relation 320 to one another as shown in FIG. 17. Alternatively, Step 608 may include interleaving a stabilizing element 300 (FIG. 18) within the composite plies 214 (FIG. 18) such that at least one of the composite plies 214 of the laminate 204 extends upwardly and over one or more of the stabilizing element edges 308 (FIG. 18) in overlapping relation 318 to the stabilizing element 300 as shown in FIG. 18.

Step 610 of the method 600 of FIG. 19 may include applying compaction pressure 324 to the laminate 204 such as during vacuum bagging and/or autoclaving. FIG. 7 illustrates the co-bonding of a structural member 400 to the panel 206. The structural member 400 may comprise cured or pre-cured composite plies 218 or non-composite material. The panel 206 may comprise uncured composite plies 216. The vacuum bag 326 may be extended over the structural member 400 and the panel 206 for applying compaction pressure 324 for consolidating and/or curing the composite structure 200. The curing process may optionally be performed in an autoclave (not shown) to provide controlled curing conditions including control of the magnitude of vacuum pressure (not shown), control of the heat-up rate (not shown) of the composite plies 214, control of the cure temperature (not shown), control of the hold time (not shown), and/or control of other cure parameters. During curing, the composite plies 214 may be heated to reduce the viscosity of the resin 226 (FIG. 7) and allow the resin 226 to flow and intermingle with the resin 226 in adjacent composite plies 214 (FIG. 7). The heating up of the composite plies 214 may also initiate a cross-linking reaction for curing composite plies 214 formed of thermosetting material. Composite plies 214 formed of thermoplastic material may be heated to a temperature exceeding the glass transition temperature to reduce the viscosity of the resin 226 to promote intermingling of the resin 226.

Step 612 of the method 600 of FIG. 19 may include mitigating fiber distortion 244 (FIG. 7) in the composite plies 214 (FIG. 7) of the composite structure 200 (FIG. 7) using one or more stabilizing elements 300 (FIG. 7) that may be located at one or more compression discontinuities 258 (FIG. 20) and/or geometric discontinuities 256 (FIG. 9) that may be associated with a laminate 204 (FIG. 7). Such compression discontinuities 258 or geometric discontinuities 256 may occur as result of non-uniform compaction pressure 329, differential coefficients of thermal expansion (CTE) of the laminate 204 (e.g., in-plane CTE vs. through-thickness CTE), and/or as a result of differences in the composite plies 214 CTE relative to the CTE of other components (not shown). Compression discontinuities 258 and/or geometric discontinuities 256 may also occur at locations that may be susceptible to cure shrinkage (not shown) of resin material 228 (FIG. 7) in the composite plies 214, at regions of low compaction pressure 330 (FIG. 6), at regions of high compaction pressure 332 (FIG. 8), and/or at locations where there is a variation in the laminate thickness 246 (FIG. 8) such as at pad-ups 250 (FIG. 15) in a panel 206 (FIG. 15). However, such compression discontinuities 258 or geometric discontinuities 256 may occur as a result of any factor that may result in a deviation of the fibers 230 (FIG. 8) from a desired orientation (not shown) in the composite plies 214.

Referring to FIG. 20, shown is an illustration of a block diagram of a composite structure 200 having one or more stabilizing elements 300 included with the composite plies 214. The composite structure 200 may be made up of a laminate 204 to form a structural member 400, a panel 206, or any one of a variety of other composite structures 200, without limitation. The laminate 204 may be made up of composite plies 214. Each one of the composite plies 214 may be formed of fiber-reinforced polymeric material 224 and including resin 226 and fibers 230. The fibers 230 in each one of the composite plies 214 may be commonly aligned (e.g., unidirectional) or the fibers 230 may be woven into or more directions to form a fabric (not shown).

In FIG. 20, each one of the composite plies 214 may have a laminate coefficient of thermal expansion (CTE) 238. One or more compression discontinuities 258 or geometric discontinuities 256 may be associated with the laminate 204. As described above, a compression discontinuity 258 may occur at a location of non-uniform compaction pressure 329 applied to a panel 206 and/or to a structural member 400. For example, a compression discontinuity 258 may comprise a structural member edge 418 that may be disposed on a panel 206 and which may generate a region of low compaction pressure 330 (FIG. 6) due to vacuum bag bridging 328 (FIG. 7) as described above. A geometric discontinuity 256 may comprise a cross-sectional shape-change 408 that may be associated with the laminate 204 or the geometric discontinuity 256 may be a result of other factors. For example, the geometric discontinuity 256 may comprise a curvature change 248 such as in a structural member 400. The geometric discontinuity 256 may also comprise a pad-up 250 or a local increase in the quantity of plies in the laminate 204 makes up a panel 206. The geometric discontinuity 256 may also comprise a radius filler 440 that may be incorporated into a structural member 400.

Referring still to FIG. 20, the composite structure 200 may further include a stabilizing element 300 that may be installed with the composite plies 214 or applied on top of the composite plies 214. The stabilizing element 300 may be adhesively bonded to one or more of the composite plies 214 using an adhesive layer 314. The stabilizing element 300 may preferably have a relatively high stabilizing element stiffness 302 at the cure temperature or processing temperature of the composite plies 214 such that the stabilizing element 300 may mitigate or minimize the occurrence of out-of-plane fiber distortion 244 (FIG. 13) that may otherwise occur in a laminate 204 due to compression discontinuities 258 or geometric discontinuities 256 associated therewith. Furthermore, the stabilizing element 300 preferably has a stabilizing element CTE 304 that may be substantially similar to the laminate CTE 238 in order to minimize the generation of residual stress in the composite structure 200 during the curing process. The stabilizing element 300 may have stabilizing element edges 308 that may preferably be located to extend beyond the locations of a compression discontinuity 258 or geometric discontinuity 256 in order to constrain the composite plies 214 to remain substantially in-plane (not shown) and preventing out-of-plane fiber distortion 244 during compaction and/or consolidation of the composite plies 214.

Figure 21:
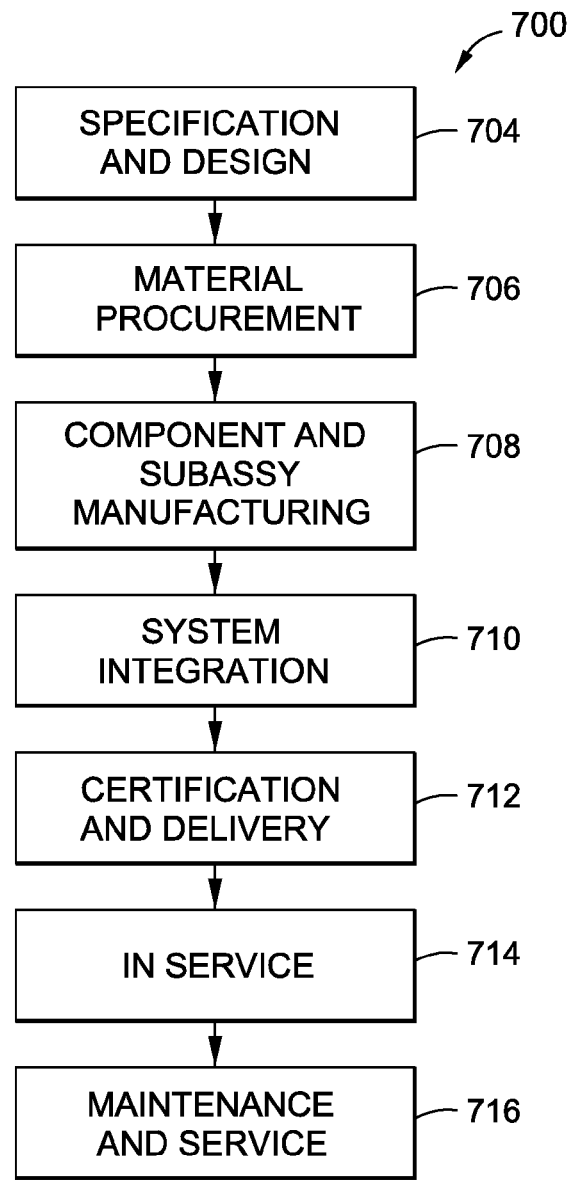
FIG. 21 is an illustration of a flow diagram of an aircraft production and service methodology.
Figure 22:
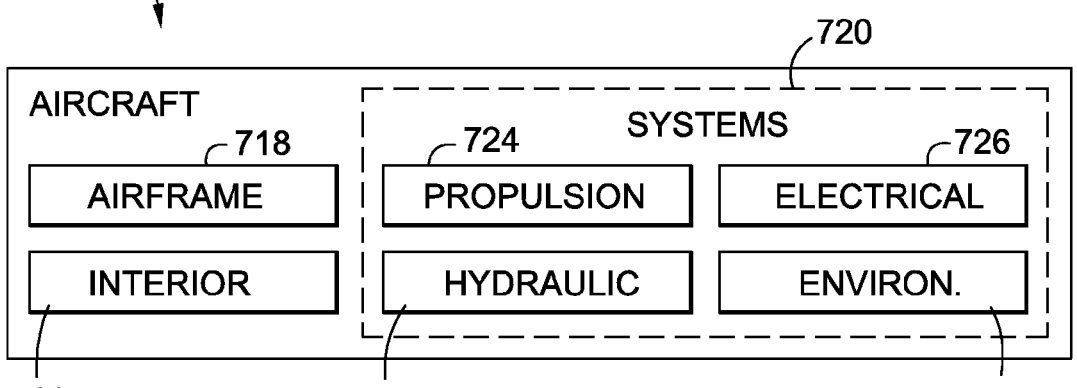
FIG. 22 is a block diagram of an aircraft.

Referring to FIGS. 21-22, embodiments of the disclosure may be described in the context of an aircraft manufacturing and service method 700 as shown in FIG. 21 and an aircraft 702 as shown in FIG. 22. During pre-production, exemplary method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine maintenance and service 716 (which may also include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22 the aircraft 702 produced by exemplary method 700 may include an airframe 718 with a plurality of systems 720 and an interior 722. Examples of high-level systems 720 include one or more of a propulsion system 724, an electrical system 726, a hydraulic system 728, and an environmental system 730. Any number of other systems may be included. Although an aerospace example is shown, the principles of the disclosed embodiments may be applied to other industries, such as the automotive industry.

The stabilizing element 300 (FIG. 17) and methods embodied herein may be employed during any one or more of the stages of the production and service method 700. For example, components or subassemblies corresponding to production process 708 may be fabricated or manufactured in a manner similar to components or subassemblies produced while the aircraft 702 is in service. Also, one or more stabilizing element 300 embodiments, method embodiments, or a combination thereof may be utilized during the production stages 708 and 710, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance and service 716.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composite structure, comprising:
   a laminate having a plurality of composite plies and a laminate surface;
   a compression discontinuity associated with the laminate;
   a stabilizing element included with the composite plies below the laminate surface and being located proximate the compression discontinuity for preventing localized out-of-plane fiber distortion of the composite plies at the compression discontinuity; and
   the stabilizing element having stabilizing element edges and being located in a common plane with at least one composite ply having ply edges, the stabilizing element and the at least one composite ply arranged in one of the following configurations:
   the stabilizing element edges disposed in opposing relation to the ply edges;
   the at least one composite ply extending up and over the stabilizing element edges and overlapping the stabilizing element edges.

2. The composite structure of claim 1, wherein:
   the laminate comprises a panel formed of the plurality of the composite plies;
   the compression discontinuity comprises a region of low compaction pressure located proximate a structural member edge of a structural member mounted to the panel; and
   the stabilizing element being included with the composite plies and being located proximate the structural member edge.

3. The composite structure of claim 1, wherein:
   the laminate comprises a panel formed of the plurality of the composite plies;
   the compression discontinuity comprises a caul plate gap located between a pair of caul plates removably positioned against the panel; and
   the stabilizing element being included with the composite plies and being located proximate the caul plate gap.

4. The composite structure of claim 1, wherein:
   the stabilizing element has a stabilizing element coefficient of thermal expansion that is substantially equivalent to a laminate coefficient of thermal expansion.

5. The composite structure of claim 1, wherein:
   the stabilizing element has a stabilizing element stiffness in a range of from approximately 15 MSI to approximately 80 MSI.

6. The composite structure of claim 1, wherein:
   the stabilizing element is formed of stabilizing element material comprising at least one of cured composite material, ceramic material, and metallic material.

7. The composite structure of claim 1, wherein:
the stabilizing element has a stabilizing element thickness that is approximately equivalent to one of the following: a ply thickness of a composite ply, a multiple of the ply thickness.

8. The composite structure of claim 1, wherein:
the composite structure comprises a composite structure of an aircraft.

9. A composite structure, comprising:
a structural member having a plurality of composite plies and a laminate surface;
a geometric discontinuity associated with the structural member;
a stabilizing element included with the composite plies below the laminate surface and being located proximate the geometric discontinuity for preventing localized out-of-plane fiber distortion at the geometric discontinuity; and
the stabilizing element having stabilizing element edges and being located in a common plane with at least one composite ply having ply edges, the stabilizing element and the at least one composite ply arranged in one of the following configurations:
   the stabilizing element edges disposed in opposing relation to the ply edges;
   the at least one composite ply extending up and over the stabilizing element edges and overlapping the stabilizing element edges.

10. The composite structure of claim 9 wherein:
the geometric discontinuity comprises a cross-sectional shape-change in the structural member; and
the stabilizing element being included with the composite plies and being located proximate the cross-sectional shape-change.

11. The composite structure of claim 10 wherein:
the cross-sectional shape-change comprises a structural member radius formed in a structural member cross-section.

12. The composite structure of claim 10 wherein:
the structural member is comprised of a plurality of sub-laminates;
the cross-sectional shape-change comprising a radius filler located at a juncture of the sub-laminates; and
the stabilizing element being located proximate the radius filler.

13. A ply stabilizer, comprising:
a stabilizing element for a laminate having a plurality of composite plies and a laminate surface;
the laminate having a compression discontinuity associated therewith;
the stabilizing element being included with the composite plies below the laminate surface and being located proximate the compression discontinuity for preventing localized out-of-plane fiber distortion at the compression discontinuity; and
the stabilizing element having stabilizing element edges and being located in a common plane with at least one composite ply having ply edges, the stabilizing element and the at least one composite ply arranged in one of the following configurations:
   the stabilizing element edges disposed in opposing relation to the ply edges;
   the at least one composite ply extending up and over the stabilizing element edges and overlapping the stabilizing element edges.

14. The ply stabilizer of claim 13, wherein:
the laminate comprises a panel formed of the plurality of the composite plies;
the compression discontinuity comprises a region of low compaction pressure located proximate a structural member edge of a structural member mounted to the panel; and
the stabilizing element being included with the composite plies and being located proximate the structural member edge.

15. The ply stabilizer of claim 13, wherein:
the laminate comprises a panel formed of the plurality of the composite plies;
the compression discontinuity comprises a caul plate gap located between a pair of caul plates removably positioned against the panel; and
the stabilizing element being included with the composite plies and being located proximate the caul plate gap.

16. The ply stabilizer of claim 13, wherein:
the stabilizing element has a stabilizing element coefficient of thermal expansion that is substantially equivalent to a laminate coefficient of thermal expansion.

17. The ply stabilizer of claim 13, wherein:
the stabilizing element has a stabilizing element stiffness in a range of from approximately 15 MSI to approximately 80 MSI.

18. The ply stabilizer of claim 13, wherein:
the stabilizing element is formed of stabilizing element material comprising at least one of cured composite, ceramic, and metal.

19. A method of making a composite structure, comprising the steps of:
laying up a laminate with a plurality of composite plies, the laminate having a laminate surface and at least one of a compression discontinuity and a geometric discontinuity associated with the laminate;
applying a stabilizing element with the composite plies below the laminate surface;
locating the stabilizing element proximate the at least one of the compression discontinuity and the geometric discontinuity, the stabilizing element having stabilizing element edges and being located in a common plane with at least one composite ply having ply edges, the stabilizing element and the at least one composite ply arranged in one of the following configurations:
   the stabilizing element edges disposed in opposing relation to the ply edges;
   the at least one composite ply extending up and over the stabilizing element edges and overlapping the stabilizing element edges; and
preventing, using the stabilizing element, localized out-of-plane fiber distortion at the at least one of the compression discontinuity and the geometric discontinuity.

20. The method of claim 19, further comprising the step of:
laying up the laminate as a panel formed of the plurality of the composite plies and having a structural member mounted thereto; and
locating the stabilizing element proximate a structural member edge.

21. The method of claim 20, further comprising the steps of:
applying compaction pressure to the laminate;
generating the compression discontinuity comprising a region of low compaction pressure associated with the structural member edge; and mitigating, using the stabilizing element, fiber distortion in the composite plies.

22. The method of claim 19, further comprising the step of:
laying up the laminate as a structural member formed of the plurality of the composite plies.

23. The method of claim 22, further comprising the step of:
locating the stabilizing element proximate the geometric discontinuity in a structural member cross-section.

24. The method of claim 22, further comprising the step of:
locating the stabilizing element proximate the geometric discontinuity comprising a cross-sectional shape-change of a structural member cross-section.

25. The method of claim 22, further comprising the step of:
locating the stabilizing element proximate the geometric discontinuity comprising a structural member radius of a structural member cross-section.

26. The method of claim 22, further comprising the step of:
locating the stabilizing element proximate the geometric discontinuity comprising a radius filler at a juncture of a plurality of sub-laminates of the structural member.

* * * * *